United States Patent [19]
Santini

[11] Patent Number: 6,111,724
[45] Date of Patent: Aug. 29, 2000

[54] METHOD OF MAKING A MAGNETIC WRITE HEAD WITH PLATED SELF-ALIGNED ZERO THROAT HEIGHT DEFINING LAYER WITHOUT REFLECTIVE NOTCHING OF A SECOND POLE TIP

[75] Inventor: Hugo Alberto Emilio Santini, San Jose, Calif.

[73] Assignee: International Business Machines Corporation, Armonk, N.Y.

[21] Appl. No.: 09/058,676

[22] Filed: Apr. 10, 1998

[51] Int. Cl.[7] .................. G11B 5/147; G11B 5/23
[52] U.S. Cl. ............................ 360/126; 119/317
[58] Field of Search .................. 360/113, 119–121, 360/125, 126, 317

[56] References Cited

U.S. PATENT DOCUMENTS

| | | | |
|---|---|---|---|
| 4,295,173 | 10/1981 | Romankiw et al. | 360/125 |
| 4,652,954 | 3/1987 | Church | 360/120 |
| 4,819,112 | 4/1989 | Iwata et al. | 360/126 |
| 5,075,280 | 12/1991 | Pisharody et al. | 505/171 |
| 5,379,172 | 1/1995 | Liao | 360/126 |
| 5,452,164 | 9/1995 | Cole et al. | 360/113 |
| 5,576,099 | 11/1996 | Canaperi et al. | 428/332 |
| 5,590,008 | 12/1996 | Tanabe et al. | 360/126 |
| 5,649,351 | 7/1997 | Cole et al. | 29/603.14 |
| 5,652,687 | 7/1997 | Chen et al. | 360/126 |
| 5,793,578 | 8/1998 | Heim et al. | 360/126 |
| 5,802,700 | 9/1998 | Chen et al. | 29/603.14 |
| 5,805,391 | 9/1998 | Chang et al. | 360/113 |
| 5,828,533 | 10/1998 | Ohashi et al. | 360/126 |

FOREIGN PATENT DOCUMENTS

| | | | |
|---|---|---|---|
| 58-100212 | 12/1981 | Japan | 360/119 |
| 57-208618 | 12/1982 | Japan | 360/119 |
| 58-111116 | 7/1983 | Japan | 29/603 |
| 58-128017 | 7/1983 | Japan | 360/119 |
| 3-252909 | 11/1991 | Japan | 360/122 |
| 6-111245 | 4/1994 | Japan | 360/120 |

*Primary Examiner*—William Klimowicz
*Attorney, Agent, or Firm*—Gray Cary Ware & Freidenrich LLP; Ervin F. Johnston

[57] ABSTRACT

A method makes a magnetic write head with a plated self-aligned zero throat height (ZTH) defining layer without reflective notching. In the method a seedlayer is deposited on a first pole piece layer, a negative resist layer is photopatterned on the seedlayer with a first opening that frames a location for a second pole piece, a positive resist layer is photopatterned on the negative resist layer with a second opening that frames a location for the ZTH defining layer, the ZTH defining layer is plated, the positive resist is removed, the second pole piece is plated and the negative resist is removed. The ZTH defining layer has a front vertical edge that is substantially parallel to an air bearing surface (ABS) and that is recessed from the ABS for defining the ZTH of the head.

46 Claims, 18 Drawing Sheets

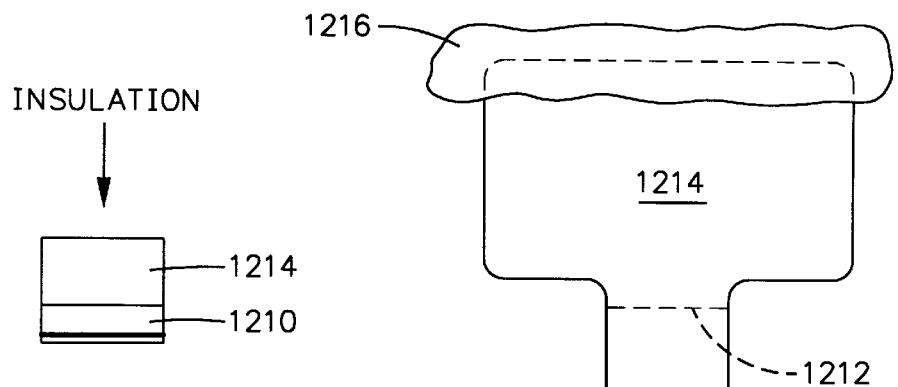
FIG. 27Y
FIG. 27Z
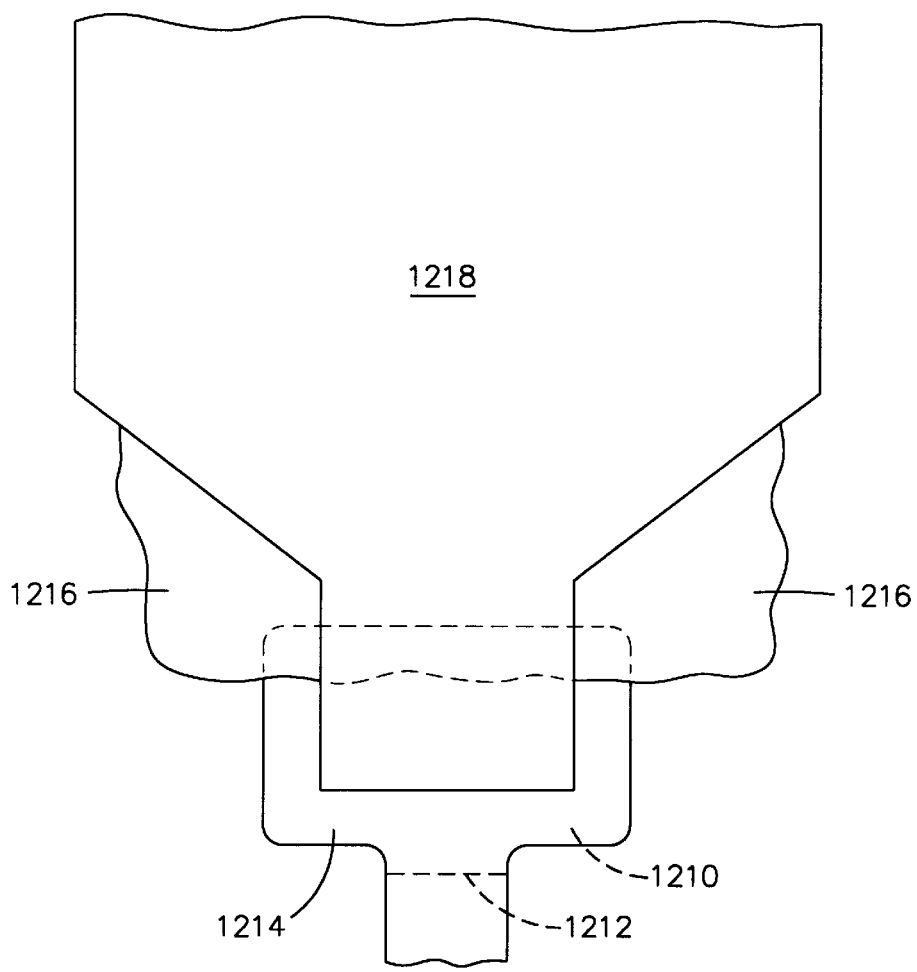
FIG. 28

METHOD OF MAKING A MAGNETIC WRITE HEAD WITH PLATED SELF-ALIGNED ZERO THROAT HEIGHT DEFINING LAYER WITHOUT REFLECTIVE NOTCHING OF A SECOND POLE TIP

BACKGROUND OF THE INVENTION

1. Field of the Invention

The present invention provides a method of making a magnetic write head with a plated self-aligned zero throat height (ZTH) defining layer without reflective notching of a second pole tip and, more particularly, to a method wherein a negative resist layer is photopatterned for a second pole piece, a positive photoresist layer is photopatterned on the negative resist layer for the ZTH defining layer, the ZTH defining layer is plated, the positive resist is removed, the second pole piece is plated and then the negative resist is removed.

2. Description of the Related Art

An inductive write head includes a coil layer embedded in first, second and third insulation layers (insulation stack), the insulation stack being located between first and second pole piece layers. A gap is formed between the first and second pole piece layers by a gap layer at an air bearing surface (ABS) of the write head. The pole piece layers are connected at a back gap. Currents are conducted through the coil layer, which produce magnetic fields in the pole pieces. The magnetic fields fringe across the gap at the ABS for the purpose of writing bais of magnetic field information in tracks on moving media, such as in circular tracks on a rotating magnetic disk or longitudinal tracks on a moving magnetic tape.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium. Since magnetic flux decays as it travels down the length of the narrow second pole tip, shortening the second pole tip will increase the flux reaching the recording media. Therefore, performance can be optimized by aggressively placing the flare point close to the ABS.

Another parameter important in the design of a write head is the location of the zero throat height (ZTH). The zero throat height is the location where the first and second pole pieces first separate from one another after the ABS. ZTH separation is imposed by an insulation layer, typically the first insulation layer in the insulation stack. Flux leakage between the first and second pole pieces is minimized by locating the ZTH as close as possible to the ABS.

Unfortunately, the aforementioned design parameters require a tradeoff in the fabrication of the second pole tip. The second pole tip should be well-defined in order to produce well-defined written tracks on the rotating disk. Poor definition of the second pole tip may result in overwriting of adjacent tracks. A well-defined second pole tip should have parallel planar side walls which are perpendicular to the ABS. This definition is difficult to achieve because the second pole tip is typically formed along with the yoke after the formation of the first insulation layer, the coil layer and the second and third insulation layers. Each insulation layer includes a hard-baked photoresist having a sloping front surface.

After construction, the first, second and third insulation layers present front sloping surfaces which face the ABS. The ZTH defining layer rises from a plane normal to the ABS at an angle (apex angle) to the plane. After hard baking of the insulation layers and deposition of a metallic seed-layer the sloping surfaces of the insulation layers exhibit a high optical reflectivity. When the second pole tip and yoke are constructed, a thick layer of photoresist is spun on top of the insulation layers and photo patterned to shape the second pole tip, using the conventional photo-lithography technique. In the photo-lithography step, ultraviolet light is directed vertically through slits in an opaque mask, exposing areas of the photoresist which are to be removed by a subsequent development step. One of the areas to be removed is the area where the second pole piece (pole tip and yoke) is to be formed by plating. Unfortunately, when ultraviolet light strikes the sloping surfaces of the insulation layers in a flaring region of the second pole piece, the ultraviolet light is reflected forward, toward the ABS, into photoresist areas at the sides of the second pole tip region. After development, the side walls of the photoresist extend outwardly from the intended ultraviolet pattern, causing the pole tip plated therein to be poorly formed. This is called "reflective notching". As stated hereinabove this causes overwriting of adjacent tracks on a rotating disk. It should be evident that, if the flare point is recessed far enough into the head, the effect of reflective notching would be reduced or eliminated since it would occur behind the sloping surfaces. However, this solution produces a long second pole tip which quickly reduces the amount of flux reaching the recording medium.

The high profile of the insulation stack causes another problem after the photoresist is spun on a wafer. When the photoresist is spun on a wafer it is substantially planarized across the wafer. The thickness of the resist in the second pole tip region is higher than other regions of the head since the second pole tip is substantially lower on the wafer than the yoke portion of the second pole piece. During the light exposure step the light progressively scatters in the deep photoresist like light in a body of water causing poor resolution during the light exposure step.

A scheme for minimizing reflective notching and poor resolution problems is to construct a stitched second pole piece, which has a bottom pole tip layer and a top second pole piece layer. The bottom second pole piece layer is constructed before the insulation layers of the insulation stack so as to eliminate the reflective notching problem. After forming the first pole piece layer and the write gap layer, a photoresist layer is spun on the partially completed head. Ultraviolet light from the photo-patterning step is not reflected forward since the photoresist layer does not cover an insulation stack. Further, the photoresist is significantly thinner in the pole tip region so that significantly less light scattering takes place. After plating the bottom second pole piece layer the photoresist layer is removed and the first insulation layer, the coil layer and the second and third insulation layers are formed. The top second pole piece layer is then stitched (connected) to the bottom second pole tip layer and extends from the ABS to the back gap. Unfortunately, the ZTH is dependent upon the location of the recessed end of the bottom second pole tip layer. Since the bottom second pole tip layer has to be long enough to provide a sufficient stitching area, this length may result in undesirable flux leakage between the first and second pole pieces. If the ZTH defining layer is located forward of the back wall of the bottom second pole tip layer in order to locate the ZTH closer to the ABS, the front sloping surface of the ZTH defining layer will cause reflective notching when the bottom second pole tip layer is constructed, thereby defeating the purpose of the stitched second pole piece.

Accordingly, there is a strong felt need in the art to construct a ZTH defining layer as close a desired to the ABS without causing reflective notching when the second pole piece is constructed.

SUMMARY OF THE INVENTION

The present invention provides a method of construction which permits a ZTH defining layer to be constructed as close as desired to the ABS without causing reflective notching when the second pole piece is constructed. The method includes forming a seed layer on a write gap layer, photopatterning a negative resist layer on the seedlayer with a first opening that frames a location where a portion of a second pole piece is to be formed, photopatterning a positive resist layer on the negative resist layer with a second opening that opens into the first opening and that frames a location where a metallic zero throat height (ZTH) defining layer is to be formed for defining the ZTH, plating the ZTH defining layer through the second opening on a first exposed portion of the seed layer, removing the positive resist layer leaving the negative resist layer with its first opening, plating the portion of the second pole piece through the first opening on the second metallic layer and on a second exposed portion of the seed layer and removing the positive resist layer. When the negative resist is light imaged the molecular chain of the portion exposed to the light is crosslinked which prevents it from being developed and removed. The portion of the negative resist that was not light imaged can be developed and removed. It is just the opposite with positive resist. The portion of the positive resist that is exposed to light during the light image step is removed by developing. Accordingly, with the present method two resist frames are constructed with the opening of the positive resist frame opening into the opening of the negative resist frame. Since the negative resist frame for the second pole piece is constructed before the ZTH defining layer there is no reflective notching of the negative resist frame for either a single layer second pole piece head or a stitched second pole piece head. Further, a long bake cycle of photoresist to provide a ZTH defining layer has been eliminated.

With the present method the ZTH defining layer can be constructed with a front vertical edge as contrasted to a front sloping edge. Hard baked photoresist can result in a ZTH defining layer with a front sloping edge of about 25 degrees whereas a plated ZTH defining layer can result in a near vertical front edge. Modeling indicates that there is a significant drop in flux leakage with a vertical edge as contrasted to a sloping edge. The present invention also provides an embodiment where the ZTH defining layer is extended over one of the insulation layers of the insulation stack to further separate the first and second pole pieces. Optionally, the gap layer may also extend over one of the insulation layers of the insulation stack to still further separate the first and second pole pieces. The method can be employed with write heads that have single layer second pole pieces or stitched second pole pieces, sunken heads, merged heads, side by side heads wherein any embodiment may employ a single or a double coil. A read head portion of a merged head or a side by side head may employ an anisotropic magnetoresistive (AMR) sensor or a spin valve sensor.

An object of the present invention is to provide a method of making a ZTH defining layer that does not cause reflective notching when the second pole piece is constructed.

Another object is to provide a method of making a near vertical edge of a ZTH defining layer that defines a ZTH as close as desired to reduce flux leakage between first and second pole pieces without causing reflective notching when the second pole piece is constructed.

A further object is to frame plate top and bottom components wherein a resist frame for the top component can be made before a making of a resist frame for the bottom component so that reflective notching is obviated in the making of the resist frame for the top component.

Still another object is to provide a write head with a ZTH defining layer that has a near vertical edge for defining the ZTH to optimize reduction of flux leakage between first and second pole pieces and has a thickness less than a coil layer but greater than a write gap layer for improving the performance of the second pole piece by reducing its profile.

Still a further object is to provide a plated ZTH defining layer and/or a gap layer that is extended over one of the insulation layers of an insulation stack for further separating first and second pole pieces from one another.

Still another object is to construct a ZTH defining layer that is not subjected to subsequent process variations, such as ion milling after constructing a coil layer.

Other objects and attendant advantages of the present invention will become apparent upon reading the following detailed description taken together with the accompanying drawings.

BRIEF DESCRIPTION OF THE DRAWINGS

FIG. 28 is a top illustration of the front portion of the merged magnetic head formed by the method shown in FIGS. 27A–27Z.

DESCRIPTION OF THE PREFERRED EMBODIMENTS

Magnetic Disk Drive

Figure 1:
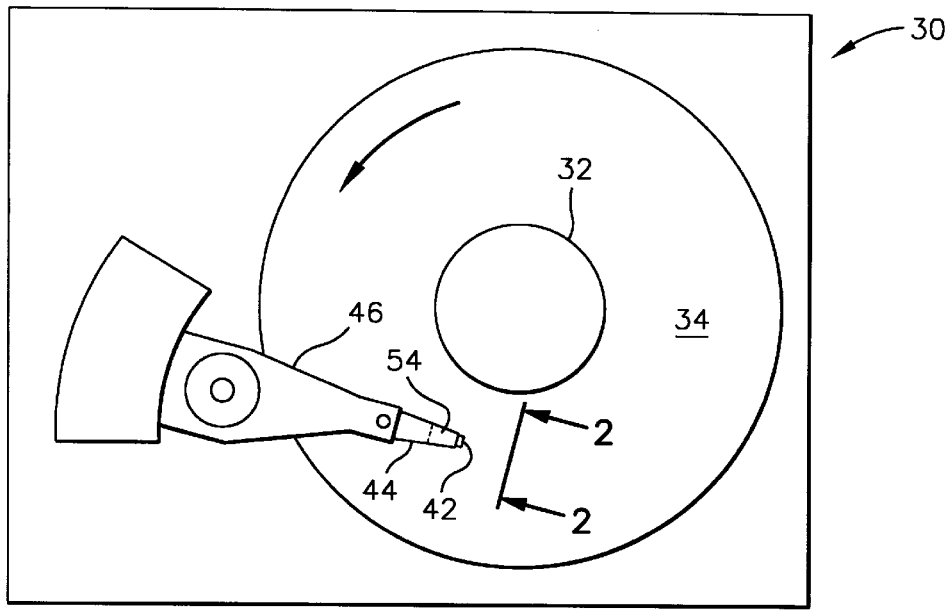
FIG. 1 is a planar view of an exemplary magnetic disk drive.
Figure 2:
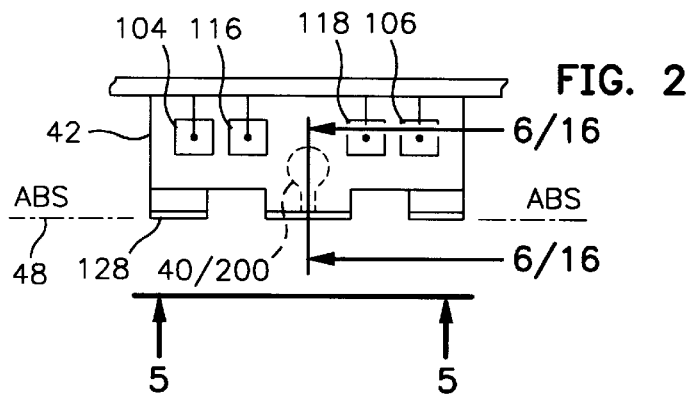
FIG. 2 is an end view of a slider with a magnetic head of the disk drive as seen in plane 2—2.
Figure 3:
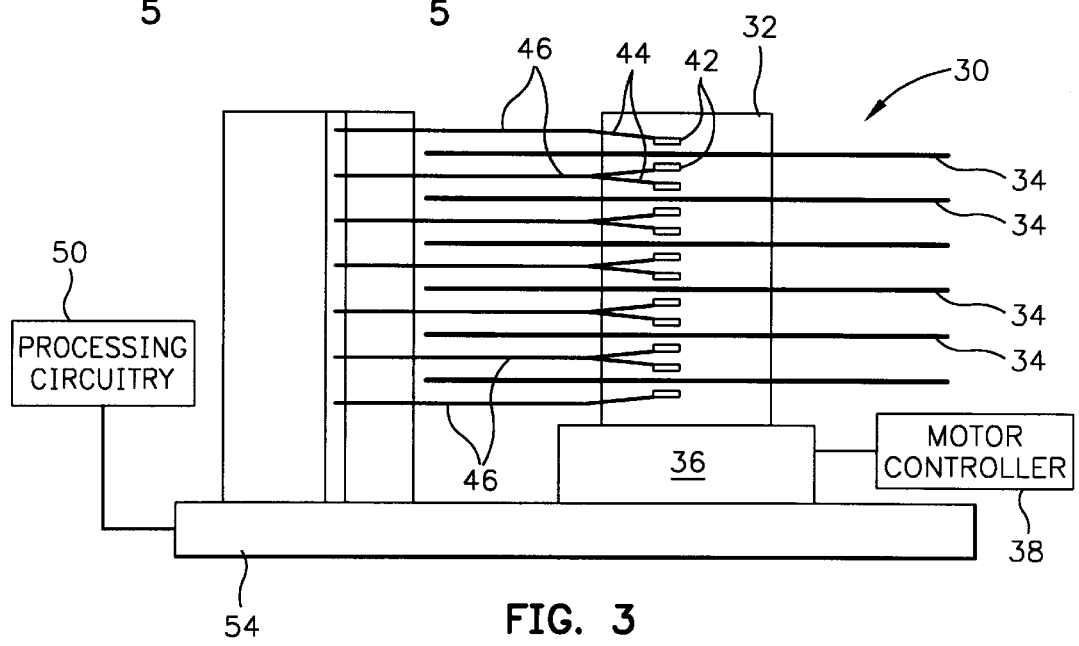
FIG. 3 is an elevation view of the magnetic disk drive wherein multiple disks and magnetic heads are employed.
Figure 4:
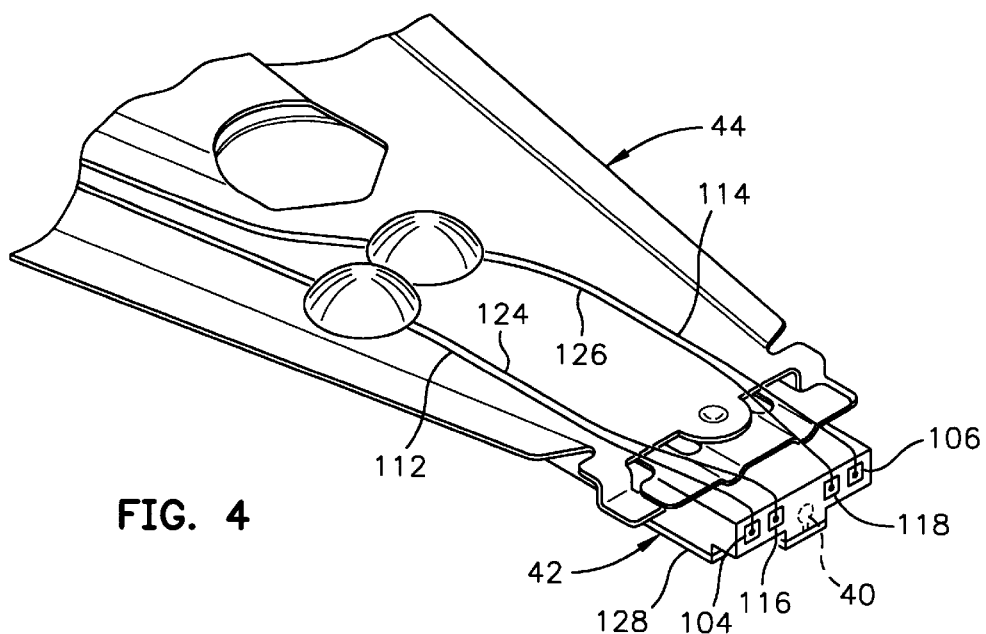
FIG. 4 is an isometric illustration of an exemplary suspension system for supporting the slider and magnetic head.

Referring now to the drawings wherein like reference numerals designate like or similar parts throughout the several views there is illustrated in FIGS. 1–3 a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to the suspension 44. The components described hereinabove may be mounted on a frame 54, as shown in FIG. 3.

Figure 5:
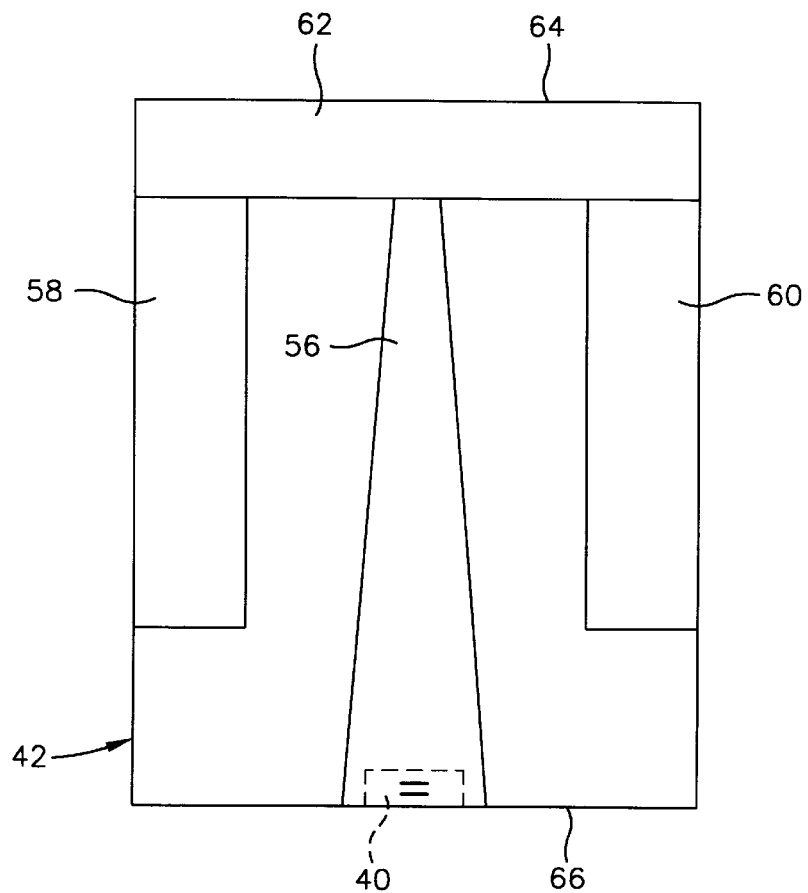
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Prior Art Merged Head

Figure 6:
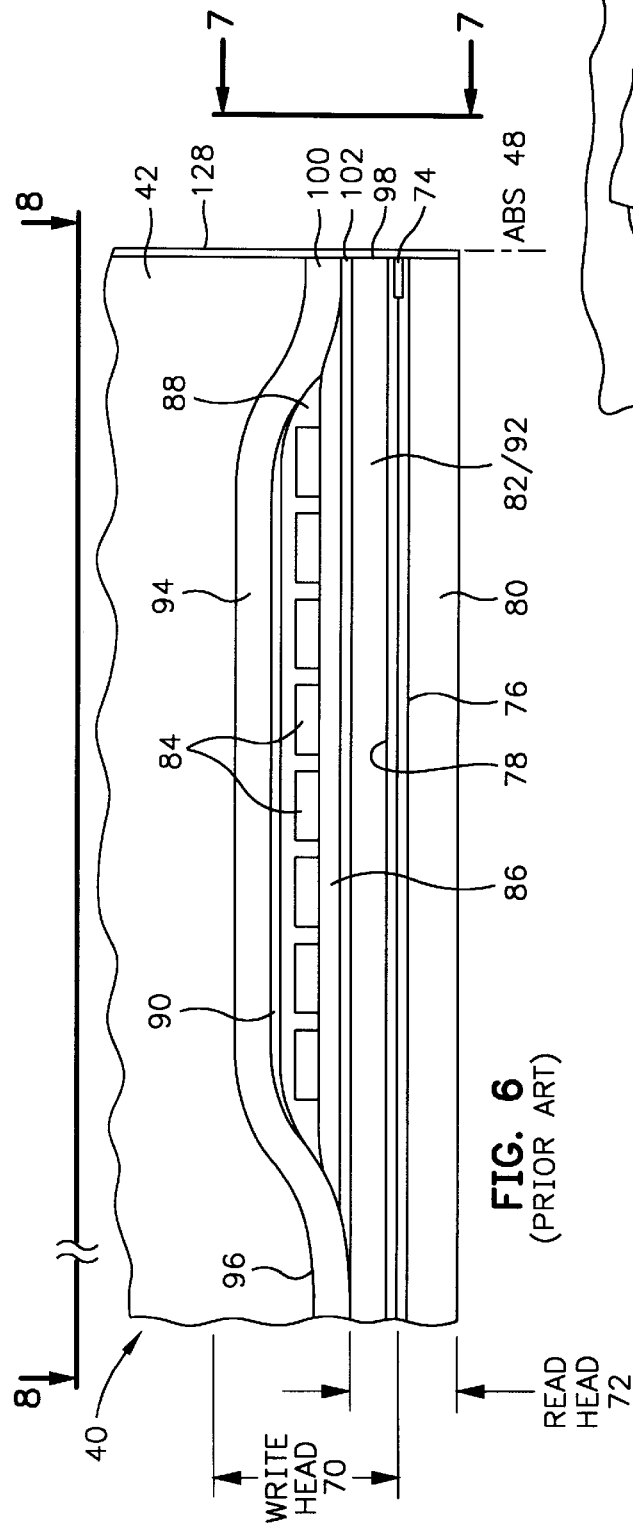
FIG. 6 is a partial view of the slider and a prior art magnetic head as seen in plane 6—6 of FIG. 2.
Figure 7:
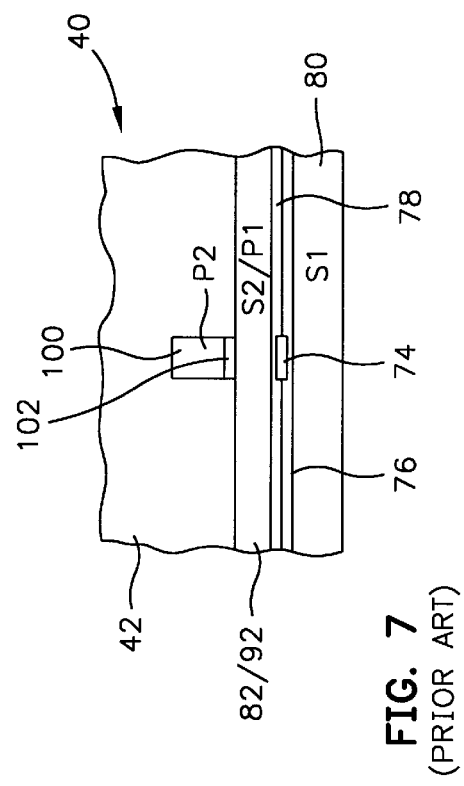
FIG. 7 is a partial ABS view of the slider taken along plane 7—7 of FIG. 6 to show the read and write elements of the prior art magnetic head.

In the following figures insulation layers of the head have been stippled to distinguish them from metal layers of the head. FIG. 6 is a side cross-sectional elevation view of the merged MR or spin valve head 40 which has a prior art write head portion 70 and a read head portion 72, the read head portion employing an MR or spin valve sensor 74. FIG. 7 is an ABS view of FIG. 6. The sensor 74 is located between first and second gap layers 76 and 78 and the gap layers are located between first and second shield layers 80 and 82. In response to external magnetic fields, the resistance of the sensor 74 changes. A sense current $I_S$ conducted through the sensor causes these resistance changes to be manifested as potential changes. These potential changes are then processed as readback signals by the processing circuitry 50 shown in FIG. 3.

Figure 8:
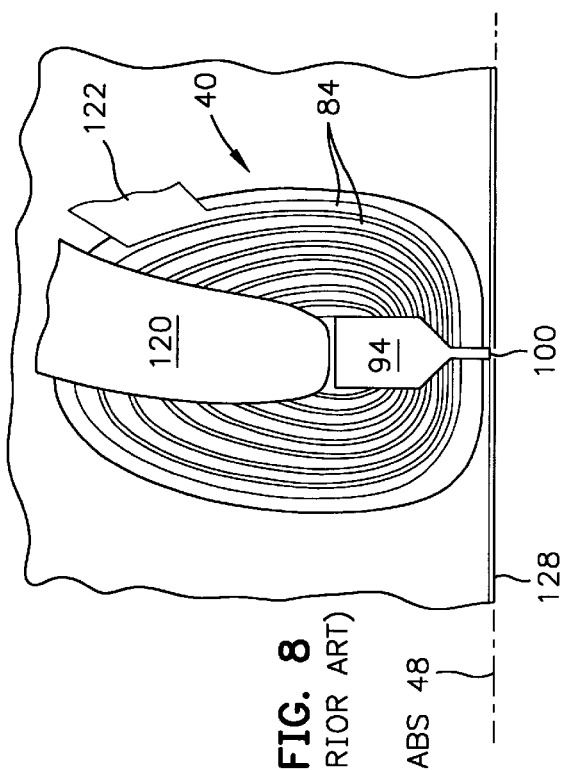
FIG. 8 is a view taken along plane 8—8 of FIG. 6 with all material above the second pole piece removed.

The prior art write head portion of the merged head includes a coil layer 84 located between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are located between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the sensor 74 to leads 112 and 114 on the suspension 44 and third and fourth solder connections 116 and 118 connect leads 120 and 122 from the coil 84 (see FIG. 8) to leads 124 and 126 on the suspension. A wear layer 128 may be employed for protecting the sensitive elements of the magnetic head, as shown in FIGS. 2, 4, 6 and 7. It should be noted that the merged head 50 employs a single layer 82/92 to serve a double function as a second shield layer for the read head and as a first pole piece for the write head. A piggyback head employs two separate layers for these functions.

Figure 9:
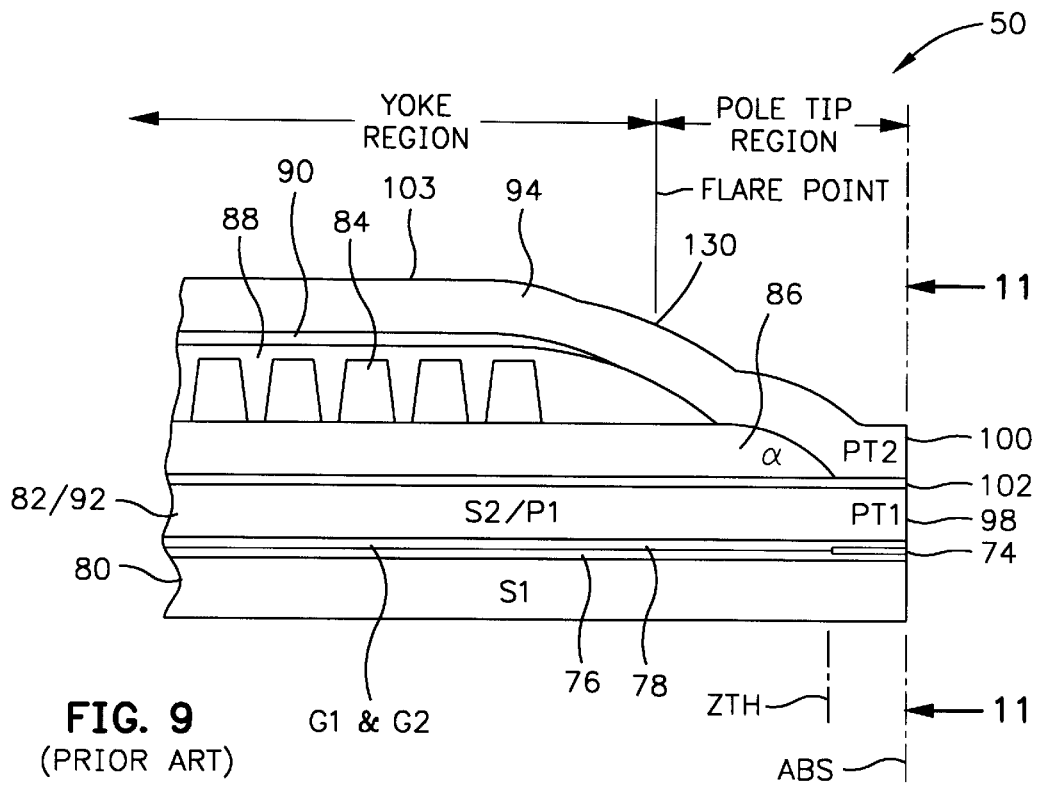
FIG. 9 is an enlarged front portion of the prior art magnetic head of FIG. 6 to show various details thereof.
Figure 12:
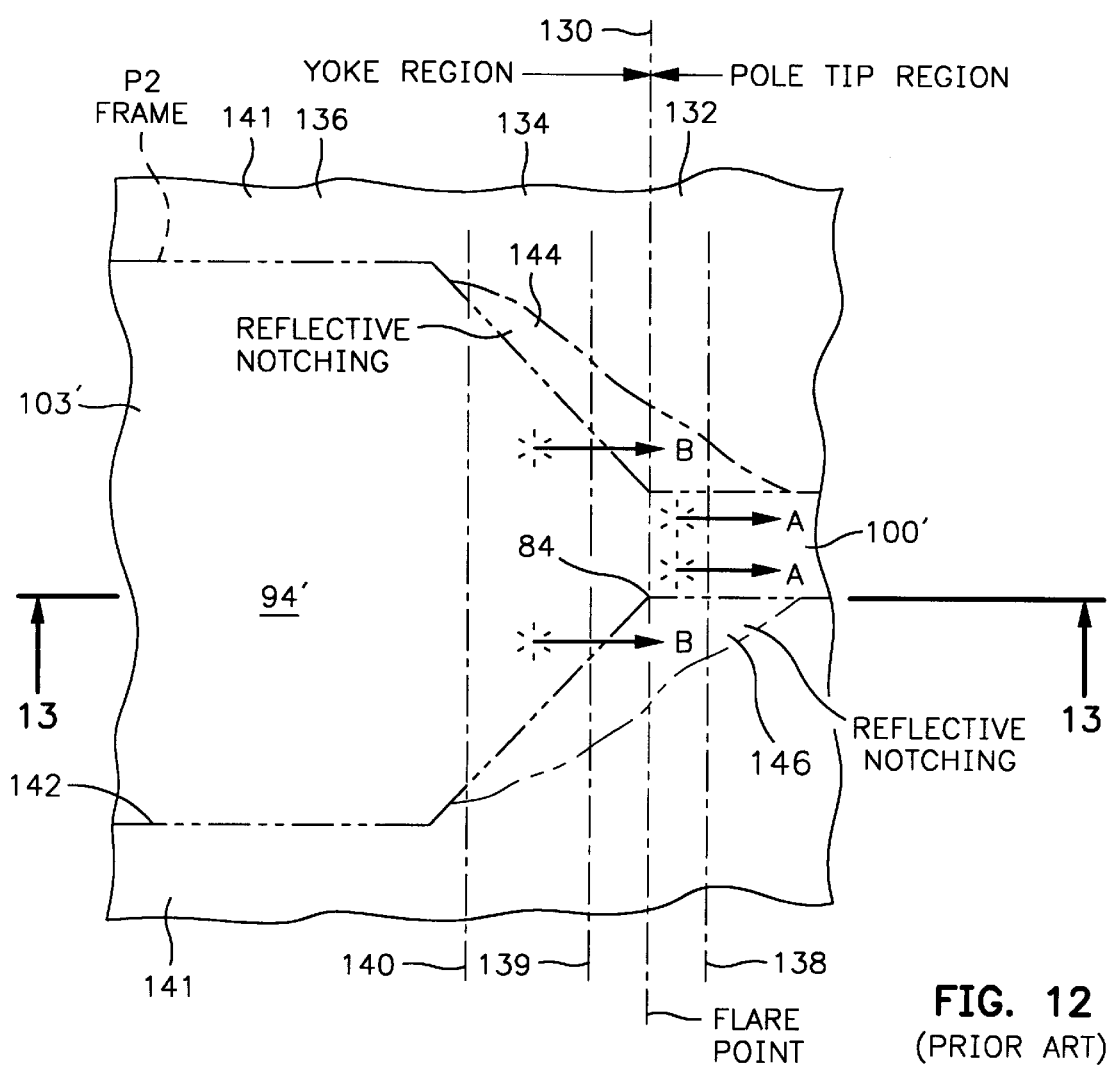
FIG. 12 is a view taken along plane 12—12 of FIG. 10.

As shown in FIG. 9, the second pole piece layer 94 has a pole tip region and a yoke region, the merging of these components being defined by a flare point 130 which is the location where the second pole piece layer 74 begins to widen as it recesses in the head. The second pole tip region extends from the ABS to the flare point 130, and the yoke region extends from the flare point 130 to the back gap 96 (see FIG. 6). In FIG. 12 are shown the pole tip region, the yoke region and the flare point 130 as defined by a photoresist mask (P2 frame).

Figure 13:
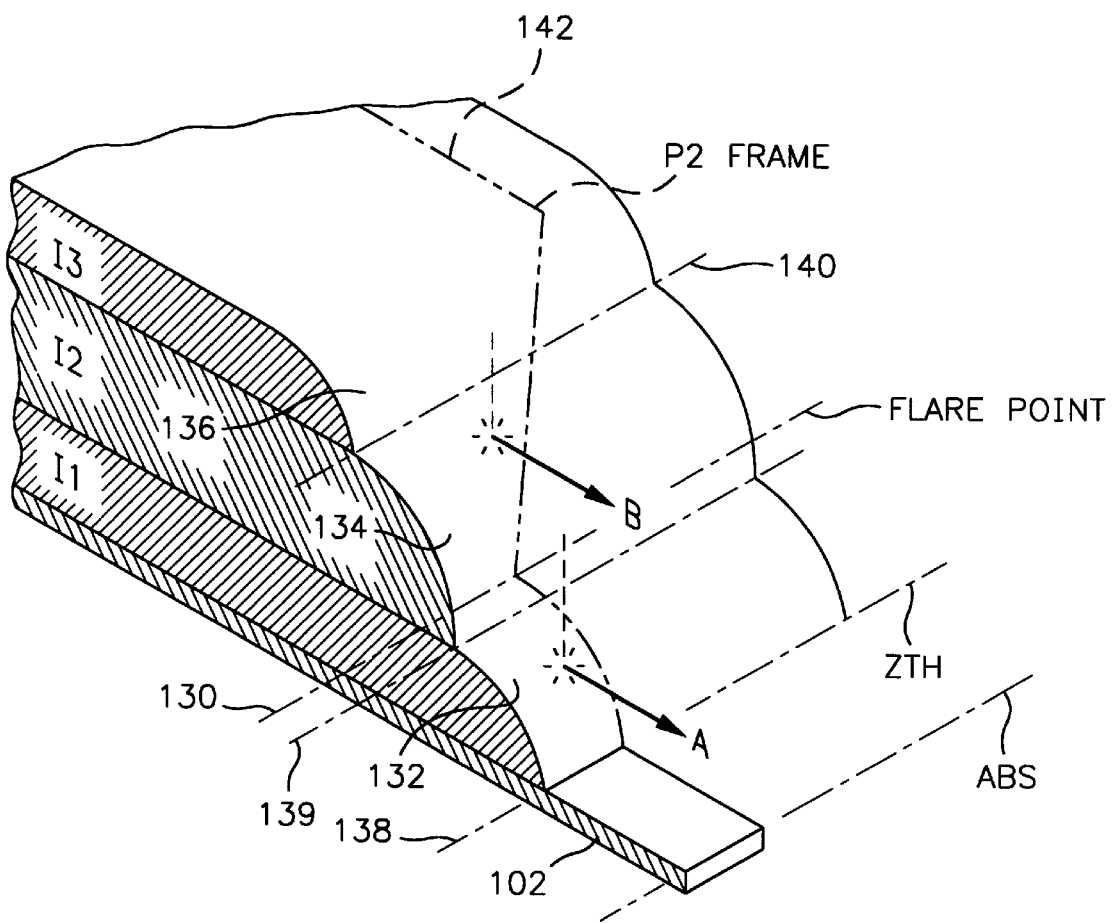
FIG. 13 is an isometric illustration of FIG. 10 without the P2 photoresist.

The location of the flare point 130, shown in FIGS. 9, 12 and 13, is an important design parameter of the write head. The further the flare point is recessed into the head, the longer the pole tip 100, which increases magnetic inductance and the likelihood that the pole tip 100 will saturate in response to flux from the coil layer 84. In the past it has been difficult to locate the flare point closer to the ABS than 10 $\mu$m because of a fabrication problem in making the second pole tip.

Another important design parameter in making the write head is the location of a zero throat height (ZTH), which is where the first and second pole piece layers 92 and 94 first separate from one another behind the ABS. It is important to locate the ZTH as close as possible to the ABS (typically within about 1 $\mu$m) in order to reduce flux loss between the pole pieces before the fields reach the gap layer 102 at the ABS. In the prior art, locating the ZTH close to the ABS contributed to the aforementioned problem of fabricating a well-defined second pole tip 100.

Figure 10:
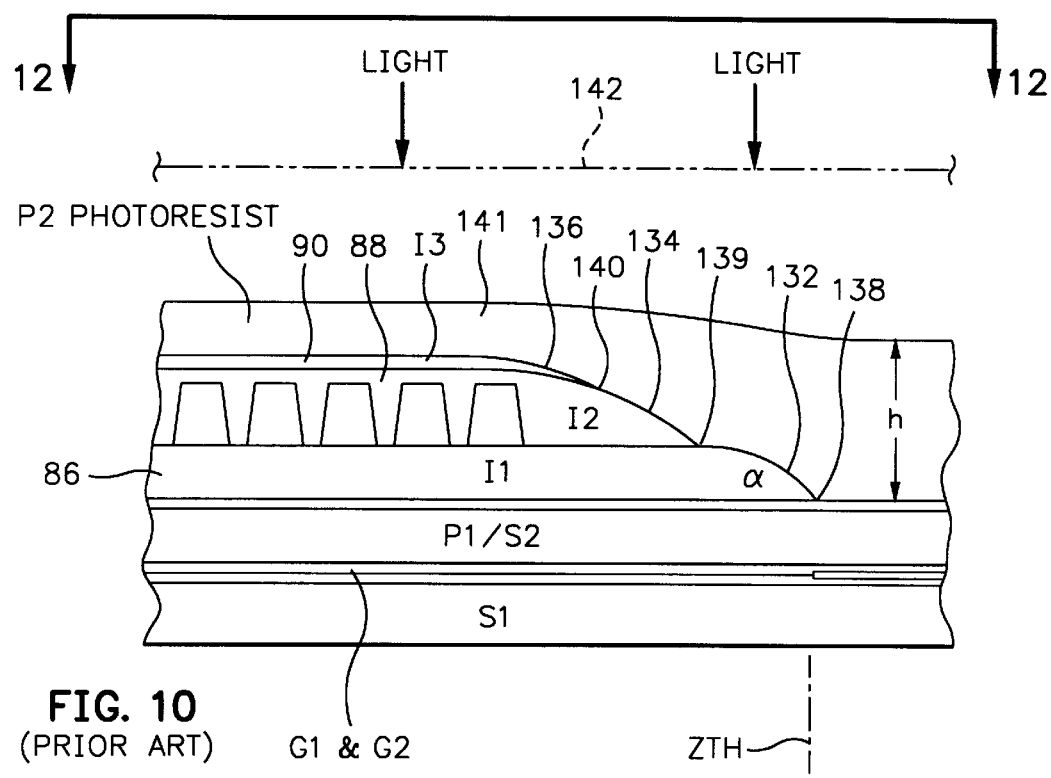
FIG. 10 is the same as FIG. 9 except a photo-patterning step is illustrated for constructing the second pole tip of the magnetic head.

FIG. 10 shows the prior art head of FIG. 9 during the step of constructing the second pole piece 94 (see FIG. 9). In FIG. 10 the first, second and third insulation layers 86, 88 and 90 are shown with sloping surfaces 132, 134 and 136 respectively, which terminate at apexes 138, 139 and 140 respectively. As stated hereinabove, the first, second and third insulation layers are hard-baked photoresist which results in the sloping surfaces 132, 134 and 136 being highly reflective to light. All of the sloping surfaces 132, 134 and 136 face the pole tip region where the second pole tip 100 of the second pole piece 94 is to be formed. As shown in FIG. 10 the second pole piece is formed with a photoresist layer 141 that is spun on top of the partially completed head. The height of the photoresist layer may be as much as 12 $\mu$m thick in the pole tip region and is typically approximately 4.5 $\mu$m thick above the third insulation layer 90. Since the flare point 130 of the second pole piece 94 (shown in FIGS. 9, 12 and 13) is located on the sloping surfaces of the insulation layers, light directed through a second pole-shaped opening (not shown) in a mask 142 will be reflected from the sloping surfaces forward toward the ABS into areas of the photoresist layer 141 adjacent the pole tip region. This causes the pole tip region to be wider than the opening in the mask 142. This is referred to as "reflective notching" and is illustrated in FIG. 12.

The photoresist pattern for the second pole piece is shown in FIG. 12 at 94' which comprises the second pole tip pattern 100' and the second pole piece yoke pattern 103'. This is referred to as the "P2 frame". Reflective notching of the photoresist layer 141 (see FIG. 10) by light reflected at an angle of incidence from the sloping layers of the insulation layers is shown at 144 and 146 in FIG. 12. When light ray A is directed downwardly during the photo-imaging step of the photoresist, it is reflected at an angle of incidence from the insulation stack into the pole tip region without causing any reflective notching of the second pole tip. However, light ray B from the photo-imaging process is reflected from the sloping surfaces of the insulation layers behind the flare point 130 at an angle of incidence into the photoresist 141 in a side region outside the intended pole tip pattern 100'. It is light reflection B and similar light reflections that cause the reflective notching shown in FIG. 12.

Figure 11:
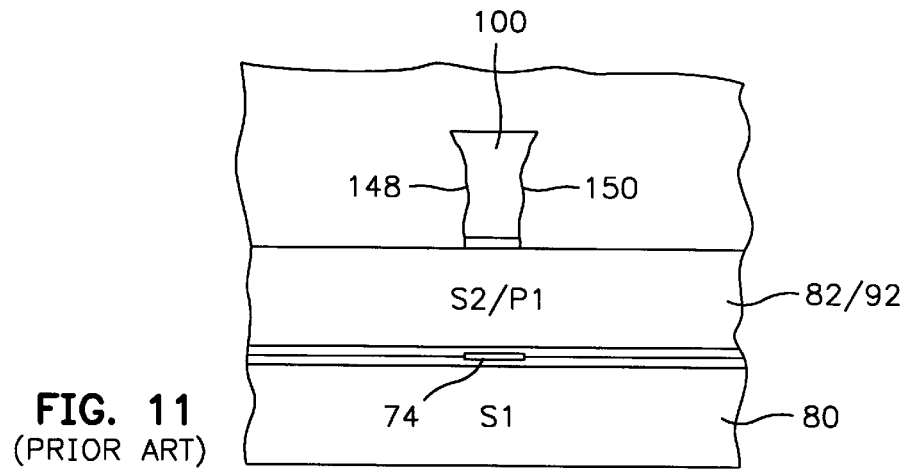
FIG. 11 is a view taken along plane 11—11 of FIG. 9.

When the second pole piece 94 is plated and the photoresist layer 141 is removed the head is complete, as shown in FIG. 9. However, the pole tip 100 is poorly formed, exhibiting irregular side walls 148 and 150, as shown in FIG. 11. Furthermore, photoresist notching results in a second pole tip 100 that has wider areas at the upper pole tip region than at the base of the pole tip (adjacent the write gap). If the irregular second pole tip 100 is used as a milling mask to notch the first pole tip 98, the wider regions of the second pole tip shadows the milling beam. Thus, the milling process is less effective at removing the first pole tip material directly beneath the side walls of the second pole tip. This results in a poorly formed P1 notched write head structure due to incomplete notching of the first pole piece 72. These poorly formed pole tips result in side writing of adjacent tracks.

The Invention

Figure 14:
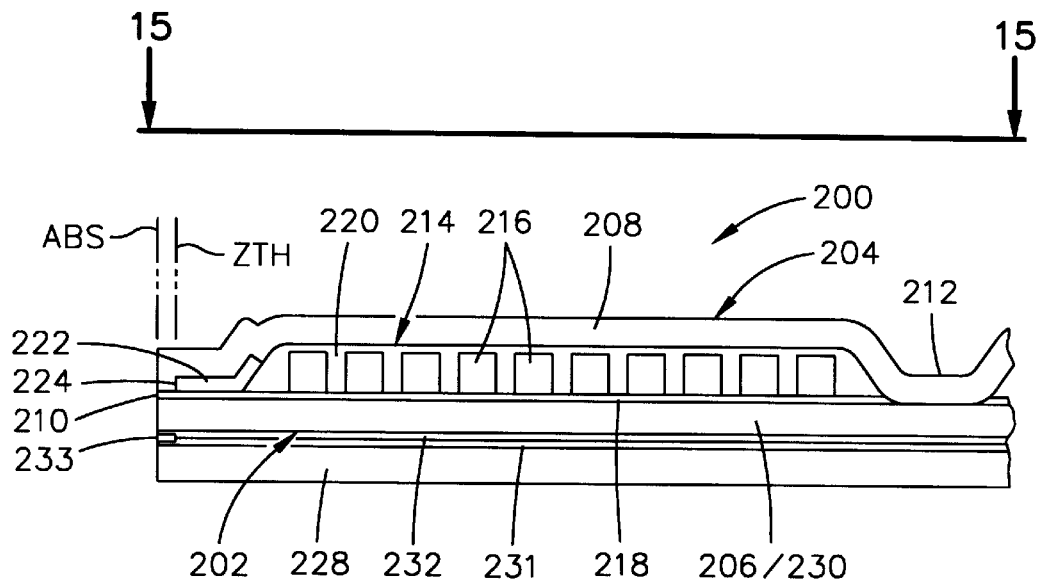
FIG. 14 is a longitudinal cross-sectional view of a single layer second pole piece single coil layer merged head embodiment of the present invention.
Figure 15:
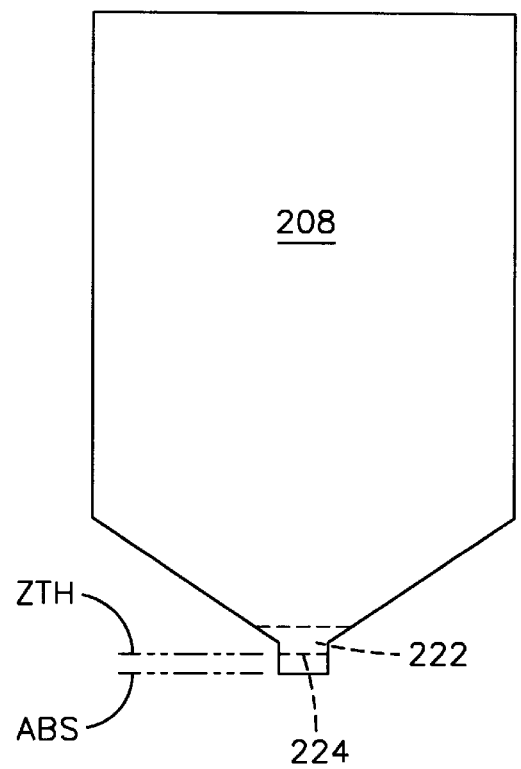
FIG. 15 is a view taken along plane 15—15 of FIG. 14.

FIGS. 14 and 15 show an embodiment 200 of the present invention, which includes first and second pole pieces 202 and 204 wherein the first pole piece has a first pole piece layer 206 and the second pole piece has a second pole piece layer 208. The first and second pole piece layers are separated by a gap layer 210 at an air bearing surface (ABS) and are magnetically connected at a back gap 212. An insulation stack 214 with a write coil layer 216 embedded therein is located between the first and second pole piece layers in a location between the ABS and the back gap 212. In this embodiment, a first insulation layer 218 of the insulation stack is an extension of the write gap layer 210. The write coil layer 216 sits directly on the first insulation layer 218 and a second insulation layer 220 separates a top surface of the write coil layer 216 from the second pole piece layer 208.

A zero throat height (ZTH) defining layer 222 is located between the ABS and the coil layer 216. The ZTH defining layer is also located directly on the gap layer 210 and has a front substantially vertical edge 224 which defines the zero throat height (ZTH) of the head where the first and second pole piece layers 206 and 208 first commence to separate after the ABS. The ZTH defining layer 222 is preferably thicker than the write gap layer 210 but thinner than the write coil layer 216. The ZTH defining layer 222 is a non-magnetic metallic layer which has been plated according to the present invention which will be described in more detail hereinafter. Preferable materials for the ZTH defining layer are NiP, Pd and Ir. The write gap layer 210 and the first insulation layer 218 are preferably alumina ($Al_2O_3$), the write coil layer 210 is preferably copper (Cu) and the first and second pole piece layers 206 and 208 are preferably Permalloy ($Ni_{80}Fe_{20}$). The near vertical edge 224 of the ZTH defining layer has improved flux reduction capability between the first and second pole piece layers as compared to a sloped edge which is characterized by the prior art baked photoresist ZTH defining layer.

The read head portion of the head includes first and second shield layers 228 and 230 wherein the second shield layer 230 is common with the first pole piece layer 206. First and second read gap layers 231 and 232 are located between the first and second shield layers 228 and 230 and a read sensor 233 is located between the first and second read gap layers. The read sensor may be either ar AMR read sensor or a spin valve sensor.

Figure 16:
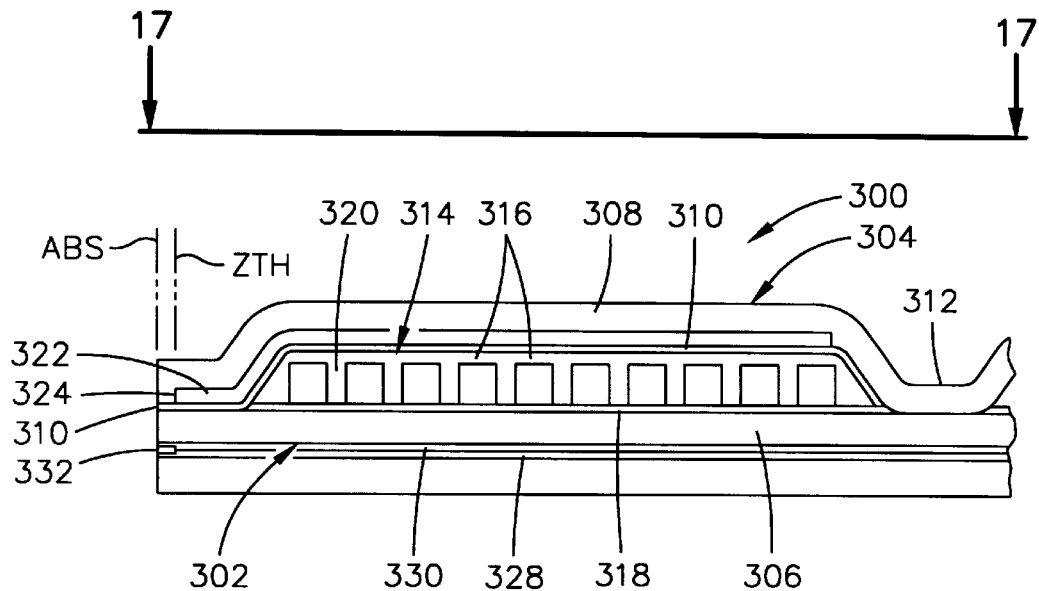
FIG. 16 is a longitudinal cross-sectional view through another embodiment of a single layer second pole piece single coil layer merged head of the present invention.
Figure 17:
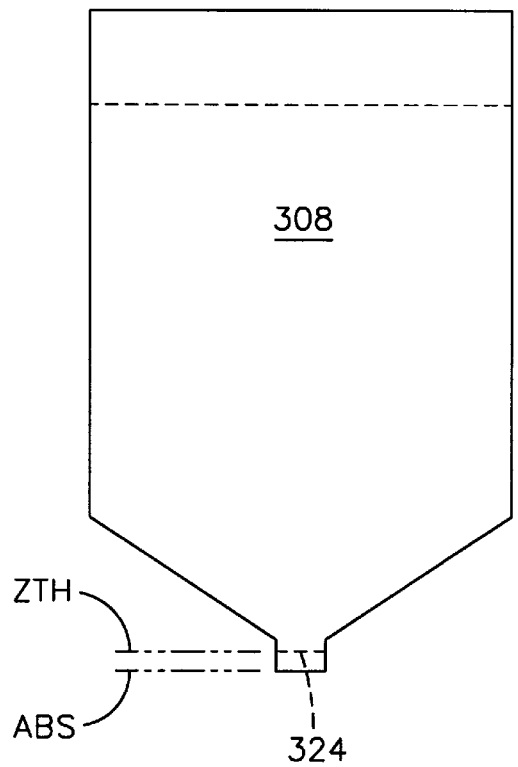
FIG. 17 is a view taken along plane 17—17 of FIG. 16.

FIGS. 16 and 17 show another embodiment 300 of the present invention which includes first and second pole pieces 302 and 304 wherein the first pole piece is a first pole piece layer 306 and the second pole piece is a second pole piece layer 308. The first and second pole piece layers are separated by a gap layer 310 at the ABS and are magnetically connected at a back gap 312. An insulation stack 314 with a single write coil layer 316 embedded therein is located between the first and second pole piece layers 306 and 308. The insulation stack 314 has a first insulation layer 318 that separates a bottom surface of the write coil layer 316 from the first pole piece layer 306 and a second insulation layer 320 that separates the top surface of the write coil layer 316 from the second pole piece layer 308. An extension of the write gap layer 310 is located on the second insulation layer 320 in a yoke region above the insulation stack 314 and extends substantially to the back gap 312. The write gap layer extension, which may be alumina, further separates the first and second pole pieces from one another in a yoke region.

A ZTH defining layer 322 is located directly on the gap layer 310 between the ABS and the write coil layer 316 and has an extension which is located directly on top of the write gap layer 310 and which extends substantially to the back gap 312. The ZTH defining layer extension further separates the first and second pole pieces from one another in the yoke region to reduce flux leakage. The ZTH defining layer 322 has a substantially vertical edge 324 which defines the ZTH of the head. As in the previous embodiment, the vertical edge 324 provides improved flux reduction between the first and second pole piece layers 306 and 308 as contrasted to a sloping edge of a prior art baked photoresist ZTH defining layer. The read head portion of this embodiment is the same as the read head portion of the embodiment shown in FIG. 14.

Figure 18:
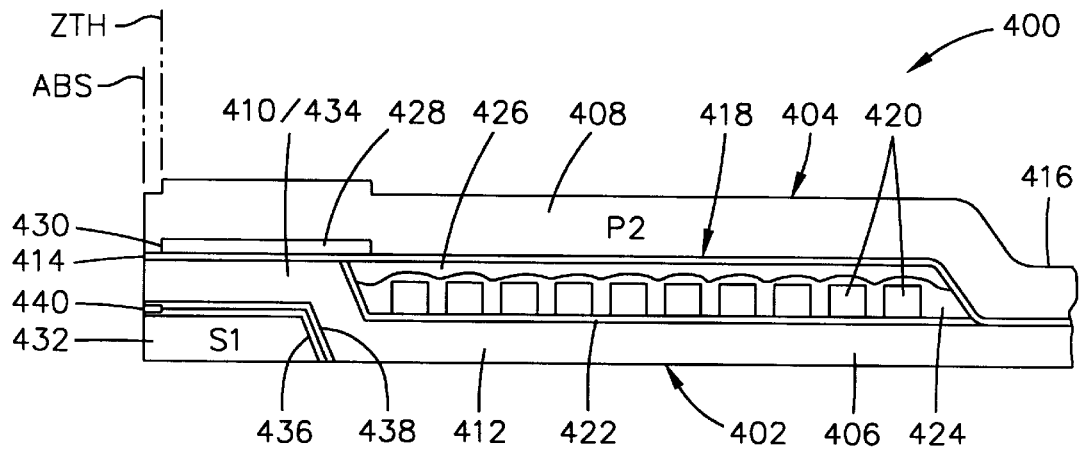
FIG. 18 is a longitudinal cross-sectional view through a further merged head of the present invention with a sunken first pole piece.

FIG. 18 illustrates a sunken merged head embodiment 400 of the present invention. The head 400 includes first and second pole pieces 402 and 404 wherein the first pole piece includes a first pole piece layer 406 and the second pole piece includes a second pole piece layer 408. The first pole piece layer is sunken and comprises first and second horizontal components 410 and 412 wherein the second component 412 is located at a lower level than the first component 410. The first horizontal component 410 and the second pole piece layer 408 are separated by a write gap layer 414 at the ABS and the second component 412 of the first pole piece layer and the second pole piece layer 408 are magnetically connected at a back gap 416. An insulation stack 418 with a write coil layer 420 embedded therein is located between the second horizontal component 412 of the first pole piece layer and the second pole piece layer 408. The insulation stack 418 includes a first insulation layer 422 which is an extension of the write gap layer 414. The bottom surface of the write coil layer 420 is located directly on the first insulation layer 422. A second insulation layer 424 is located on top of the write coil layer 420 and a third insulation layer 426 is located on the second insulation layer 424 for planarizing the head and separating the write coil layer 420 from the second pole piece layer 408.

A ZTH defining layer 428 is located on the write gap layer 414 between the first horizontal component 410 of the first pole piece layer and the second pole piece layer 408 and has a forward substantially vertical edge 430 that defines the ZTH of the merged magnetic head. The thickness of the ZTH defining layer is preferably thicker than the write gap layer 414 but thinner than the thickness of the write coil layer 420. A read head portion of the head includes a first shield layer 432 and the horizontal component 410 of the first pole piece layer as a second shield layer 434. First and second read gap layers 436 and 438 are located between the first and second shield layers 432 and 434 and a read sensor 440 is located between the first and second read gap layers 436 and 438. The read sensor 440 may be an anisotropic magnetoresistive (AMR) sensor or a spin valve sensor.

Figure 19:
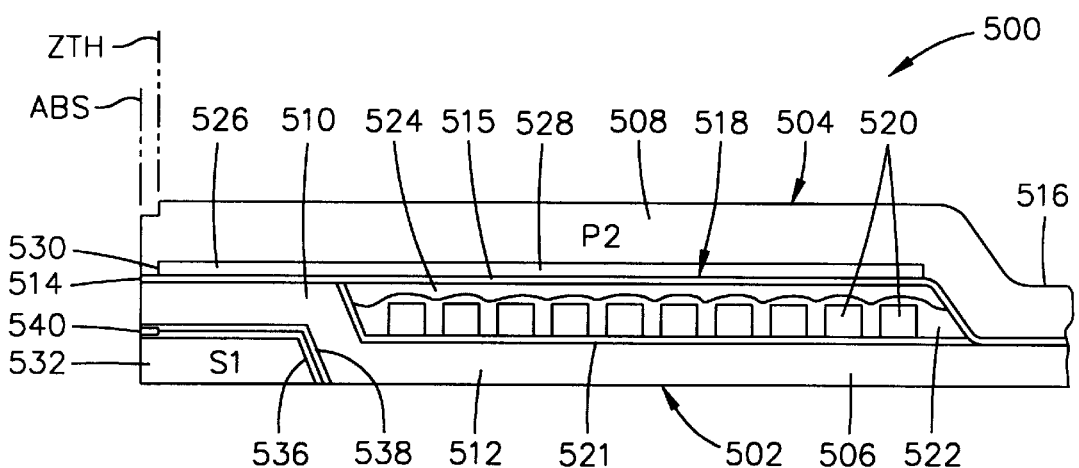
FIG. 19 is a longitudinal cross-sectional view through still another merged head embodiment of the present invention showing a sunken first pole piece.

Another merged head embodiment 500 of the present invention is shown in FIG. 19. This embodiment includes first and second pole pieces 502 and 504 wherein the first pole piece is a first pole piece layer 506 and the second pole piece is a second pole piece layer 508. The first pole piece layer 506 comprises first and second horizontal components 510 and 512 wherein the second horizontal component 512 is recessed or located at a lower level than the first horizontal component 510. The first horizontal component 510 and the second pole piece layer 508 are magnetically separated by a write gap layer 514 at the ABS and are magnetically connected at a back gap 516. An insulation stack 518 with a single write coil layer 520 embedded therein is located between the second horizontal component 512 of the first pole piece layer and the second pole piece layer 508. The insulation stack 518 includes a first insulation layer 521, which separates the write coil layer 520 from the second horizontal component 512 of the first pole piece layer, a second insulation layer 522, which is located on top of the write coil layer 520, and a third insulation layer 524, which is on the second insulation layer 522 for planarizing the insulation stack. The write gap layer 514 has an extension 515 which is located directly on the third insulation layer 524 of the insulation stack and extends substantially to the back gap 516 of the head. A ZTH defining layer 526 is located directly on the gap layer 514 between the ABS and the write coil layer 520 and has an extension 528 which is located directly on the extension of the write gap layer 514 in a yoke region of the head and extends substantially to the back gap 516. The extension 515 of the write gap layer and the extension 528 of the ZTH defining layer further separate the first and second pole pieces 506 and 508 from one another in a yoke region so as to reduce flux leakage therebetween. The second pole piece layer 508 has improved magnetic performance because of its flatness.

Figure 20:
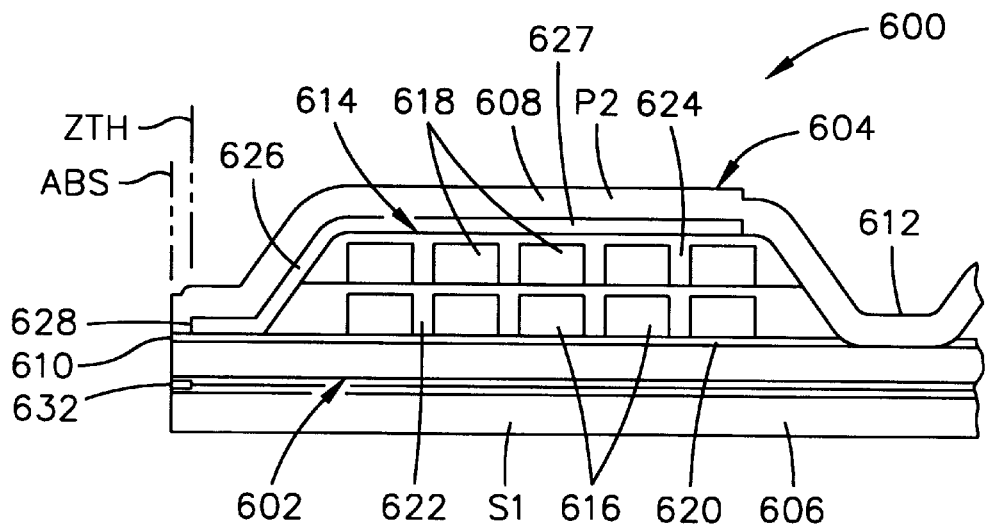
FIG. 20 is still a further merged head embodiment of the present invention with two write coil layers.

FIG. 20 shows another merged head embodiment 600 of the present invention which includes first and second pole pieces 602 and 604 wherein the first pole piece includes a first pole piece layer 606 and the second pole piece includes a second pole piece layer 608. The first and second pole piece layers 606 and 608 are magnetically separated by a write gap layer 610 at the ABS and are magnetically connected at a back gap 612. An insulation stack 614 with first and second write coil layers 616 and 618 embedded therein is located between the first and second pole piece layers 606 and 608. The insulation stack 614 includes a first insulation layer 620 which is an extension of the write gap layer 610. The first write coil layer 616 is located directly on the first insulation layer 620 and a second insulation layer 622 separates the first coil layer 616 from the second write coil layer 618. A third insulation layer 624 is located on the second write coil layer 618. A ZTH defining layer 626 is located between the ABS and the write coil layers and has a vertical edge 628 which defines the ZTH of the head. The ZTH defining layer 626 has an extension 627 which is located directly on the third insulation layer 624 and further separates the write coil layers from the second pole piece layer 608 in the yoke region so as to reduce flux leakage between the first and second pole piece layers 606 and 608.

Figure 21:
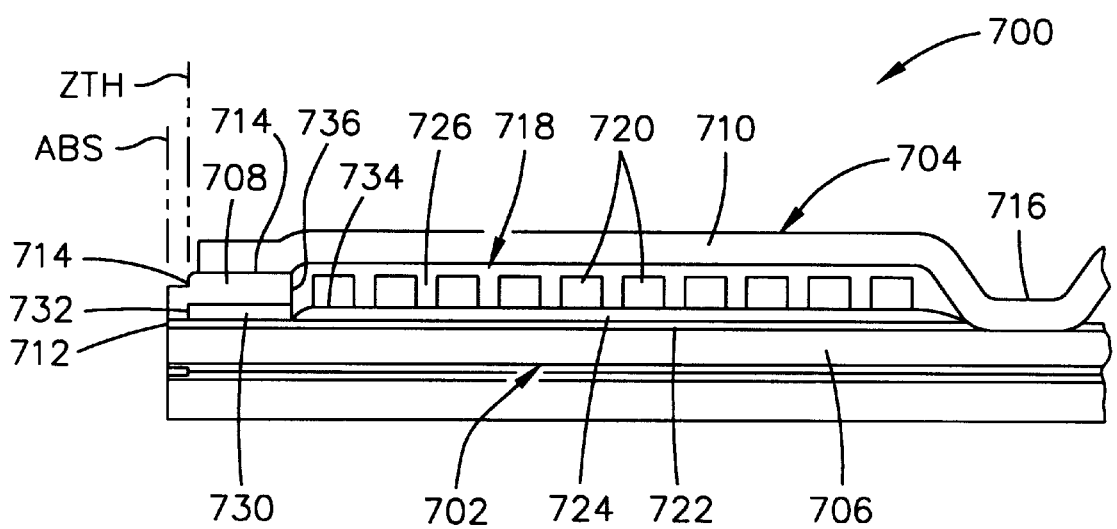
FIG. 21 is a longitudinal cross-sectional view through a merged head embodiment of the present invention showing a stitched second pole piece and a single write coil layer.
Figure 22:
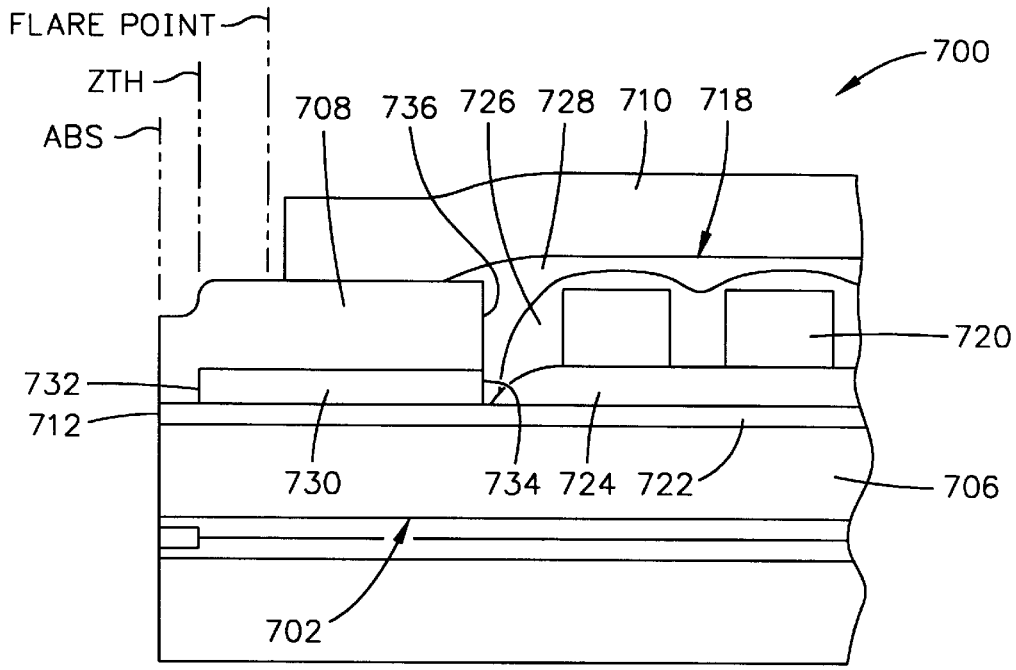
FIG. 22 is an enlarged cross-sectional illustration of the front portion of the head shown in FIG. 21.

Another merged head embodiment 700 of the present invention is shown in FIGS. 21 and 22, which includes first and second pole pieces 702 and 704, wherein the first pole piece includes a first pole piece layer 706 and the second pole piece includes a bottom second pole tip layer 708 and a top second pole piece layer 710. The bottom second pole tip layer 708 is separated from the first pole piece layer 706 by a write gap layer 712 at the ABS. The top second pole piece layer 710 is stitched (connected) to the bottom second pole tip layer 708 at 714 and is magnetically connected to the first pole piece layer 706 at a back gap 716. An insulation stack 718 with a single write coil layer 720 embedded therein is located between the first pole piece layer 706 and the top second pole piece layer 710. The insulation stack 718 has a first insulation layer 722, which may be an extension of the write gap layer 712 for insulating the write coil layer 720 from the first pole piece layer. The insulation stack may further include a second insulation layer 724 on the first insulation layer 722, further insulating the write coil layer 720 from the first pole piece layer. A third insulation layer 726 is located on the write coil layer 720 and a fourth insulation layer 728 is located on the third insulation layer 726 for planarization purposes.

A ZTH defining layer 730 is located between the first pole piece layer 706 and the bottom second pole tip layer 708 and has a substantially vertical edge 732 which defines the ZTH of the head. The ZTH defining layer 730 has a back edge 734 which is flush with a back wall 736 of the bottom second pole tip layer 708. The fourth insulation layer 728 extends over a top rear portion of the bottom second pole tip layer 708 so as to provide a transition for the top second pole piece layer 710 before it is stitched (connected) to the bottom second pole tip layer 708. The bottom second pole tip layer 708 has a flare point located between the ZTH and the write coil layer 720 where the bottom second pole tip layer 708 first commences to widen after the ABS. This widening provides an area for stitching the top second pole piece layer 710 to the bottom second pole tip layer 708 as well as reducing magnetic saturation in a pole tip region of the head. The top second pole piece layer 710 may be recessed from the ABS, as shown, or located at the ABS, as desired. When the top second pole piece layer 710 is recessed there is less flux leakage between the first pole piece layer 706 and the top second pole piece layer 710 at the ABS. The read head portion of this embodiment is the same as the read head portion of the embodiment shown in FIG. 14.

Figure 23:
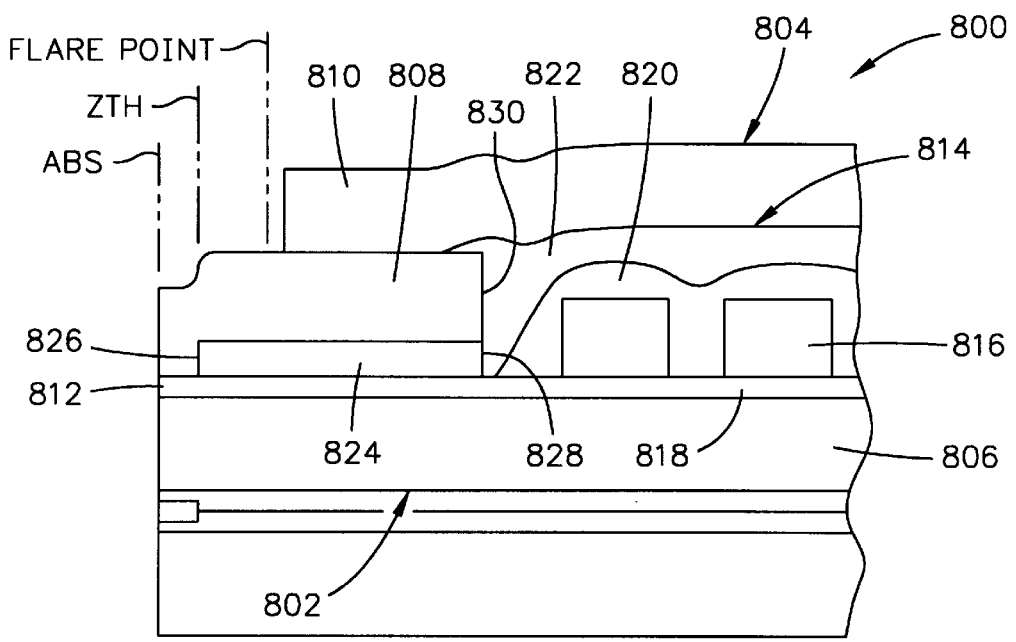
FIG. 23 is the same as FIG. 22 except with modified insulation layers of the insulation stack.

FIG. 23 shows another merged head embodiment 800 of the present invention which is a modification of the merged head shown in FIGS. 21 and 22. The head 800 includes first and second pole pieces 802 and 804 wherein the first pole piece includes a first pole piece layer 806 and the second pole piece includes a bottom first pole tip layer 808 and a top second pole piece layer 810. The bottom second pole tip layer 808 is separated from the first pole piece layer 806 by a write gap layer 812 at the ABS. The top second pole piece layer 810 is stitched (connected) to the bottom second pole tip layer 808 and is magnetically connected to the first pole piece layer 806 at a back gap (not shown). An insulation stack 814 with a single coil layer 816 embedded therein is located between the first pole piece layer 806 and the top second pole piece layer 810. The insulation stack 814 includes a first insulation layer 818 that is an extension of the write gap layer 812 and that separates the write coil layer from the first pole piece layer. The insulation stack further includes a second insulation layer 820 on the write coil layer 816 and a third insulation layer 822 on the second insulation layer 820. The third insulation layer 822 has a portion which covers a rear top portion of the bottom second pole tip layer 808 for providing a transition for the top second pole piece layer 810 before its stitched connection to the bottom second pole tip layer 808. A ZTH defining layer 824 is located entirely between the ABS and the write coil layer 816 and has a forward substantially vertical edge 826 which defines the ZTH of the head. The ZTH defining layer has a back edge 828 which is flush with a back wall 830 of the bottom second pole tip layer. The merged head 800 has a lower profile than the merged head 700 in FIGS. 21 and 22. The read head portion of this embodiment is the same as the read head portion of the embodiment shown in FIG. 14.

Figure 24:
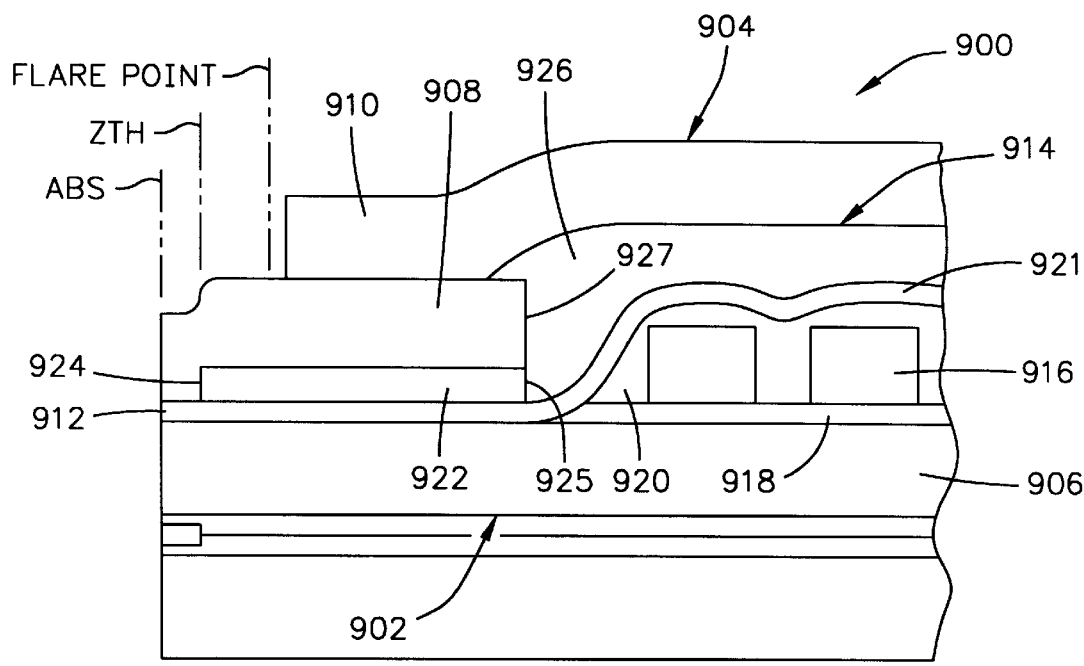
FIG. 24 is the same as FIG. 23 except the write gap layer extends over one of the layers of the insulation stack.

FIG. 24 is another merged head embodiment 900 of the present invention which includes first and second pole pieces 902 and 904 wherein the first pole piece is a first pole piece layer 906 and the second pole piece is a bottom second pole tip layer 908 and a top second pole piece layer 910. The bottom second pole tip layer 908 is separated from the first pole piece layer 906 by a write gap layer 912 at the ABS. A front portion of the top second pole piece layer 910 is stitched (connected) to a top surface of the bottom second pole tip layer 908 and is magnetically connected to the first pole piece layer at a back gap (not shown). An insulation stack 914, which includes a single write coil layer 916 embedded therein, is located between the first pole piece layer 906 and the top second pole piece layer 910. A thin first insulation layer 918, which is preferably alumina, separates the write coil layer 916 from the first pole piece layer 906. The insulation stack includes a second insulation layer 920 on the write coil layer 916. An extension 921 of the write gap layer 912 is located on the first insulation layer 920 and extends substantially to the back gap (not shown). A ZTH defining layer 922 is located between the ABS and the write coil layer 916 and has a vertical edge 924 which defines the ZTH of the head and has a vertical edge 925 that is flush with a back wall 927 of the second pole tip layer. The insulation stack 914 includes a third insulation layer 926 which is located on the ZTH defining layer 922 and has a portion which extends over a rear portion of the bottom second pole tip layer 908 for providing a transition between the top second pole piece layer 910 before it is stitched (connected) to the bottom second pole tip layer 908. The read head portion of this embodiment is the same as the read head portion of the embodiment shown in FIG. 14.

Figure 25:
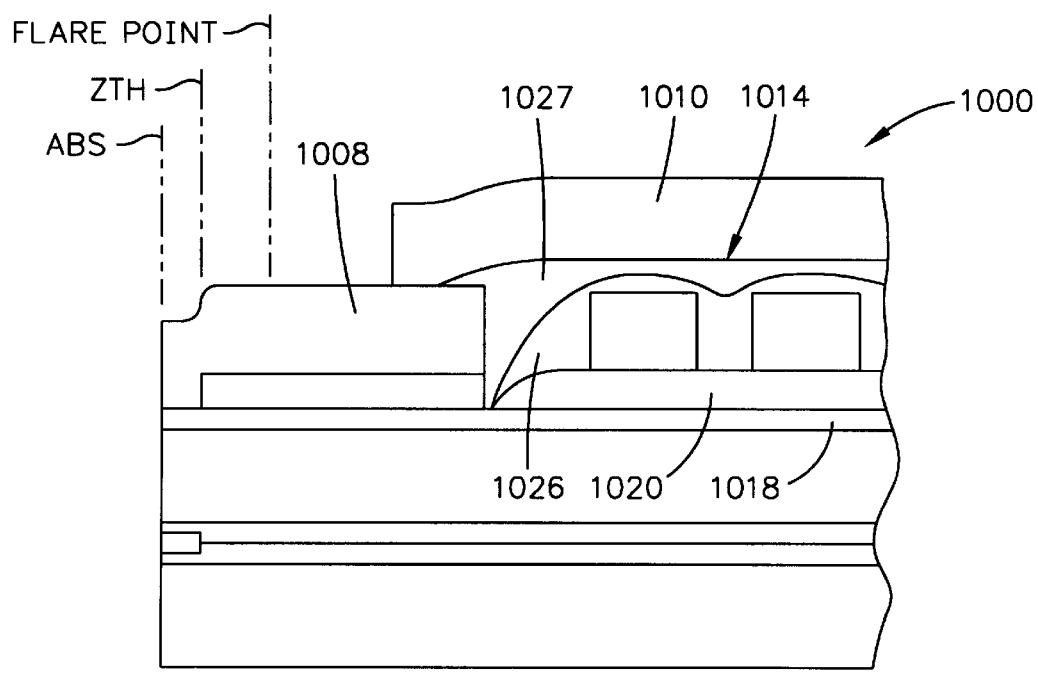
FIG. 25 is the same as FIG. 22 except the second pole piece layer is recessed further into the head.

Another embodiment of the merged MR head 1000 is shown in FIG. 25. This embodiment is the same as the embodiment shown in FIGS. 21 and 22 except the top second pole piece layer 1010 is further recessed from the ABS. Further, the insulation stack 1014 has first, second, third and fourth insulation layers 1018, 1020, 1026 and 1027. In this embodiment, the fourth insulation layer 1027 of the insulation stack extends over the rear portion of the bottom second pole tip layer 1008 instead of the third insulation layer.

Figure 26:
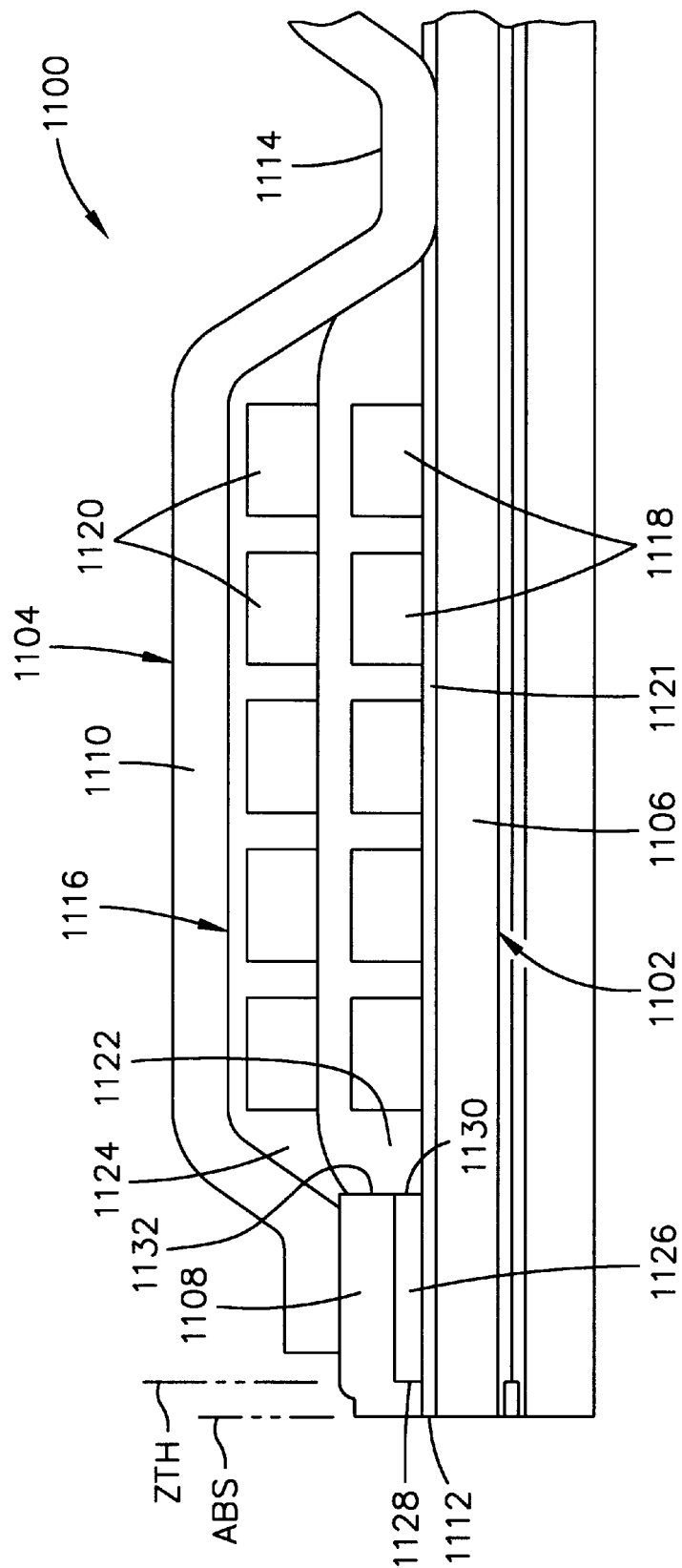
FIG. 26 is a merged magnetic head of the present invention showing a stitched second pole piece and two write coil layers.

Another merged head embodiment 1100 of the present invention is shown in FIG. 26. The embodiment 1100 includes first and second pole pieces 1102 and 1104 wherein the first pole piece includes a first pole piece layer 1106 (to and the second pole piece includes a bottom first pole tip layer 1108 and a top second pole piece layer 1110. The bottom second pole tip layer 1108 is separated from the first pole piece layer 1106 by a write gap layer 1112 at the ABS. A front portion of the top second pole piece layer 1110 is stitched (connected) to a top portion of the bottom second pole tip layer 1108 and is magnetically connected to the first pole piece layer at a back gap 1114. An insulation stack 1116 with first and second write coil layers 1118 and 1120 embedded therein is located between the first pole piece layer 1106 and the top second pole piece layer 1110. An extension 1121 of the write gap layer 1112, which is a first insulation layer of the insulation stack, separates the bottom coil layer 1118 from the first pole piece layer 1106. The insulation stack 1116 includes a second insulation layer 1122 on the first coil layer 1118 for separating the first and second coil layers and a third insulation layer 1124 on the second coil layer 1120 for separating the second coil layer 1120 from the top second pole piece layer 1110. The third insulation layer 1124 of the insulation stack extends over a rear top portion of the bottom second pole tip layer 1108 for providing a transition between the top second pole piece layer 1110 before it is stitched (connected) to the bottom second pole tip layer 1108. A ZTH defining layer 1126 is located entirely between the ABS and the first and second coil layers 1118 and 1120 and has a substantially vertical edge 1128 which defines the ZTH of the head. The ZTH defining layer 1126 has a back edge 1130 which is substantially flush with the back wall 1132 of the bottom second pole tip layer which further separates the first pole piece layer 1106 from the top second pole piece layer 1110. The read head portion of this embodiment is the same as the read head portion of the embodiment shown in FIG. 14.

In the aforementioned embodiments, the first and second pole pieces are preferably Permalloy ($Ni_{80}Fe_{20}$), the write gap layer is preferably alumina ($Al_2O_3$), the ZTH defining layer is preferably NiP, Pd or Ir, the insulation layers, except the first insulation layer, of the insulation stack are preferably baked photoresist and the first and second coil layers are preferably copper. The first insulation layer of the insulation stack is preferably alumina ($Al_2O_3$). In the embodiments where the write gap layer extends over the write coil layers, the extension of the write gap layer is the same thickness as the write gap layer at the ABS, since it has not been subjected to ion milling of a seedlayer after construction of the one or more write coil layers. When the thin insulation layer under the first coil is a common layer with the write gap layer, the write gap layer at the ABS has been subjected to process variations and should be deposited with an extra thickness so as to have a final desired write gap thickness after subsequent processing steps. The embodiments wherein the extension of the write gap layer extends over one of the insulation layers of the insulation stack is preferred since the write gap layer is deposited after removal of the seedlayer, thereby avoiding thinning during the application and removal of the seedlayer and construction of the insulation stack.

The Method of Making

Figure 27A:
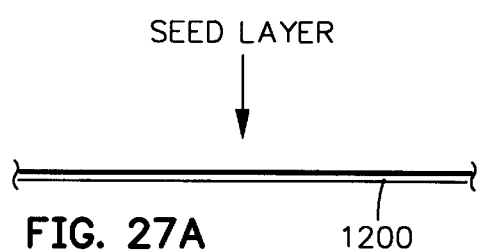
FIG. 27A shows the first step in the construction of the ZTH defining layer and the second pole piece of the merged magnetic heads shown in FIGS. 21–26 wherein a seedlayer is deposited on the write gap layer.
Figure 27B:
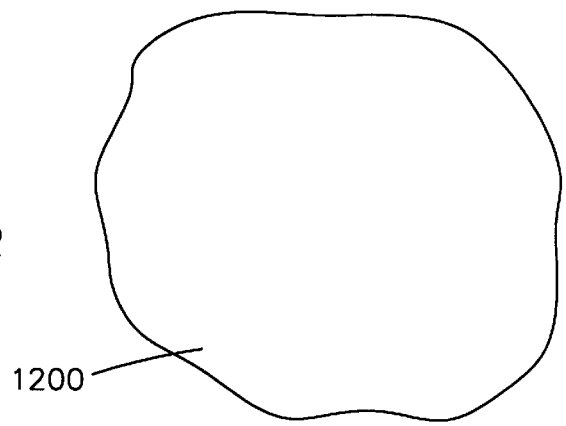
FIG. 27B is a top view of FIG. 27A.
Figure 27C:
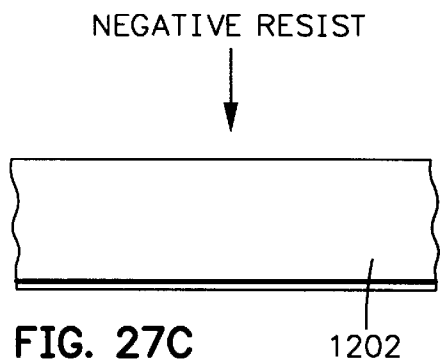
FIG. 27C and FIG. 27D are the same as FIG. 27A and FIG. 27B, respectively, except a negative resist layer has been formed.
Figure 27D:
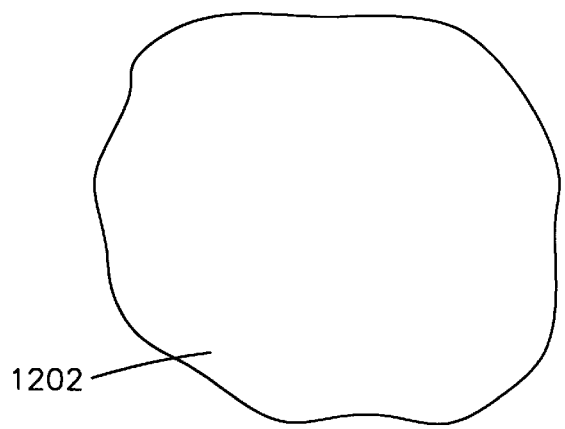
Figure 27E:
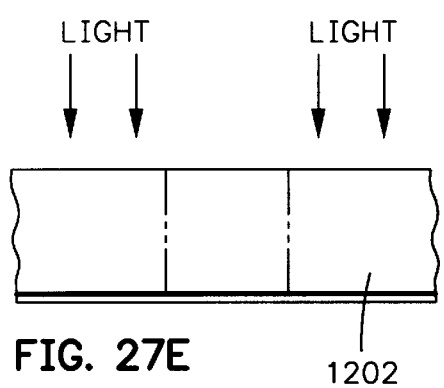
FIG. 27E and FIG. 27F are the same as FIG. 27C and FIG. 27D, respectively, except the negative resist layer has been light imaged.
Figure 27F:
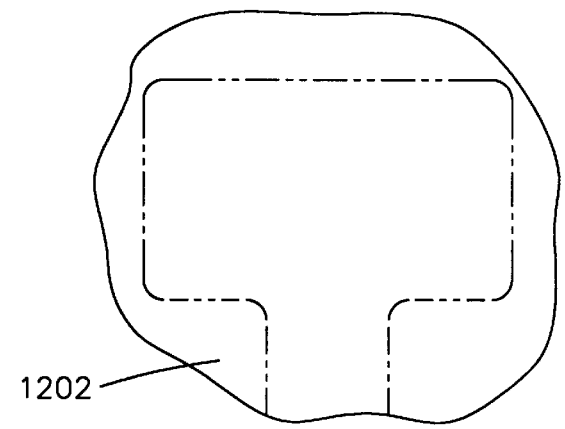
Figure 27G:
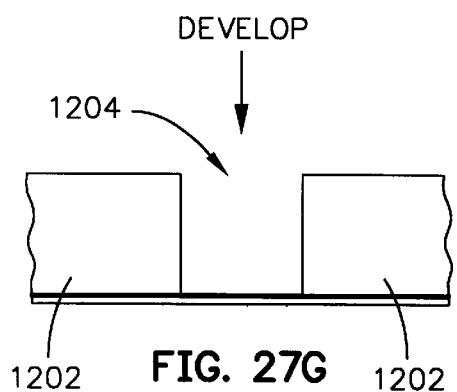
FIG. 27G and FIG. 27H are the same as FIG. 27E and FIG. 27F, respectively, except the negative resist layer has been developed.
Figure 27H:
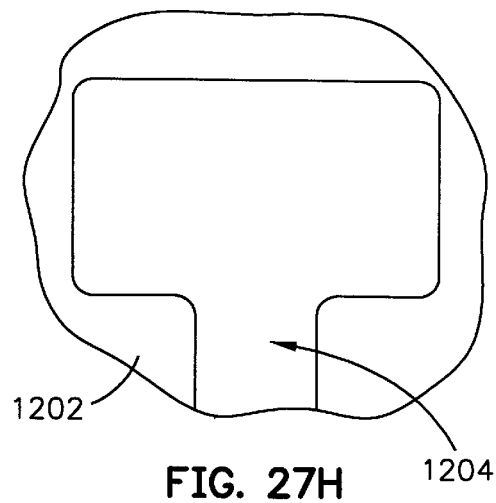
Figure 27I:
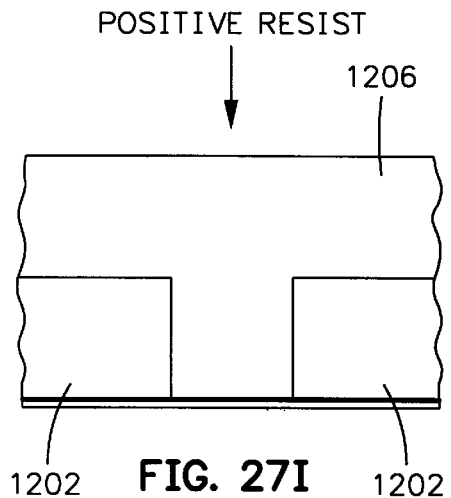
FIG. 27I and FIG. 27J are the same as FIG. 27G and FIG. 27H, respectively, except a positive resist layer has been formed on top of the negative resist layer.
Figure 27J:
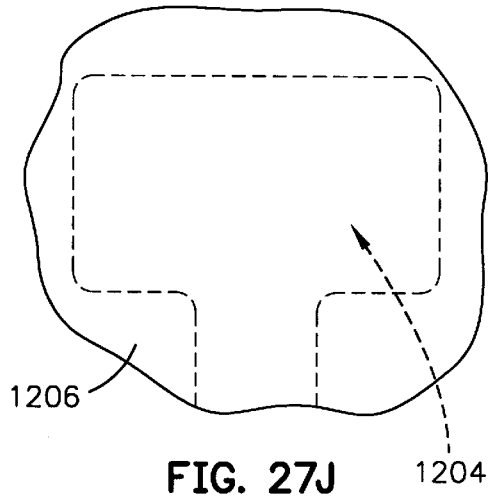
Figure 27K:
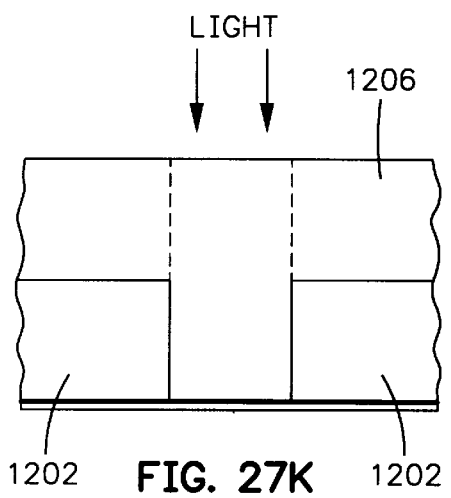
FIG. 27K and FIG. 27L are the same as FIG. 27I and FIG. 27J, respectively, except the positive resist layer has been light imaged.
Figure 27L:
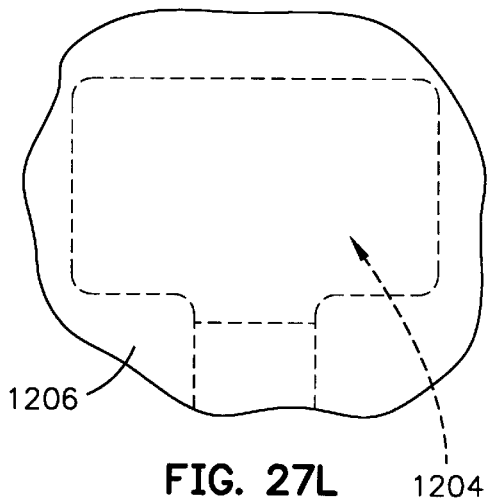
Figure 27M:
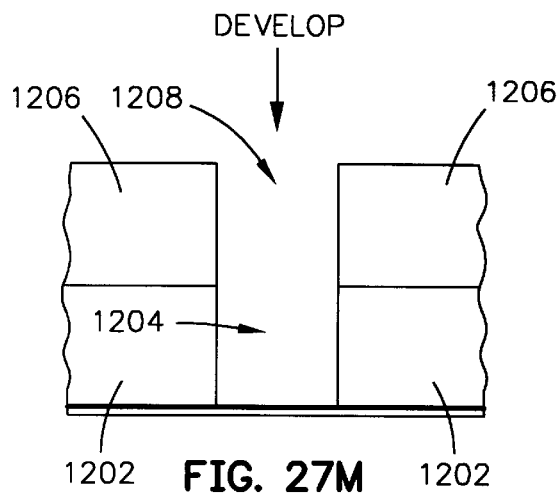
FIG. 27M and FIG. 27N are the same as FIG. 27K and FIG. 27L, respectively, except the positive resist layer has been developed.
Figure 27N:
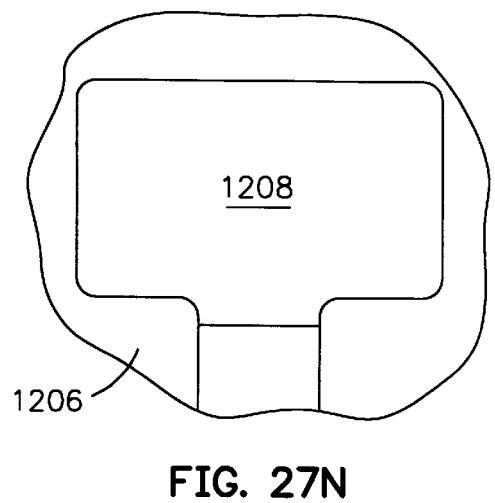
Figure 27:
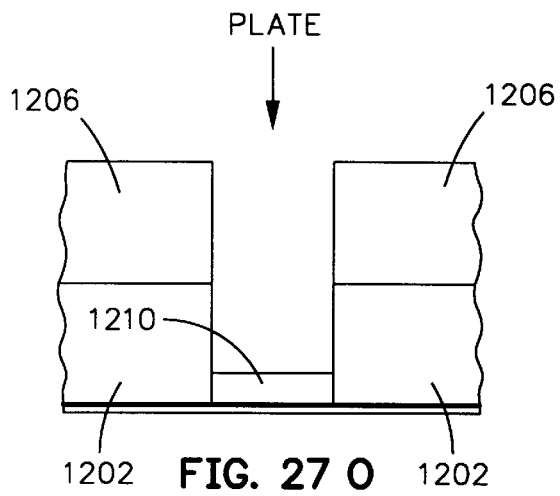
FIG. 27O and FIG. 27P are the same as FIG. 27M and FIG. 27N, respectively, except the ZTH defining layer has been plated.
FIG. 27Q and FIG. 27R are the same as FIG. 27O and FIG. 27P, respectively, except a remainder of the positive resist layer has been light imaged.
FIG. 27S and FIG. 27T are the same as FIG. 27Q and FIG. 27R, respectively, except the positive resist layer has been developed and completely removed.
FIG. 27U and FIG. 27V are the same as FIG. 27S and FIG. 27T, respectively, except a bottom second pole tip layer has been plated.
FIG. 27W and FIG. 27X are the same as FIG. 27U and FIG. 27V, respectively, except the negative resist layer has been dissolved and removed.
FIG. 27Y and FIG. 27Z are the same as FIG. 27W and FIG. 27X, respectively, except a top insulation layer of the insulation stack has been formed over a rear portion of the bottom second pole tip layer.
Figure 27P:
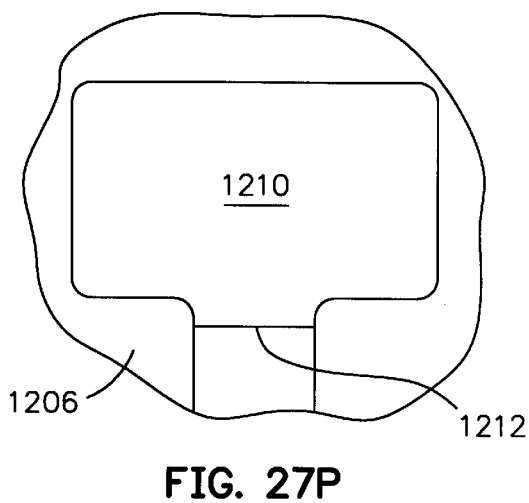
Figure 27Q:
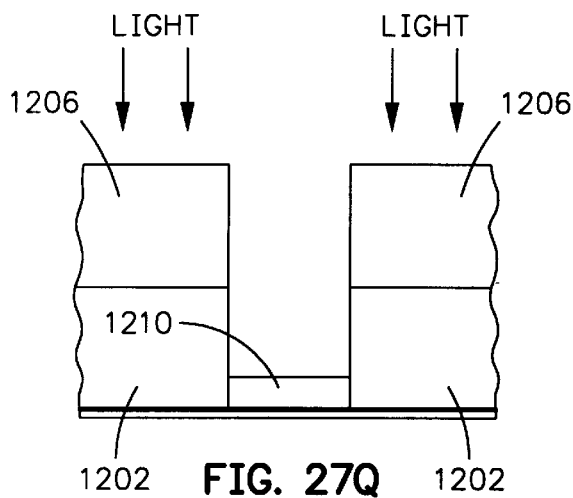
Figure 27R:
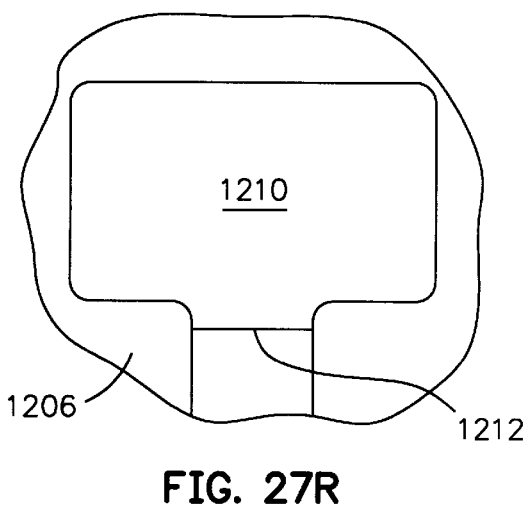
Figure 27S:
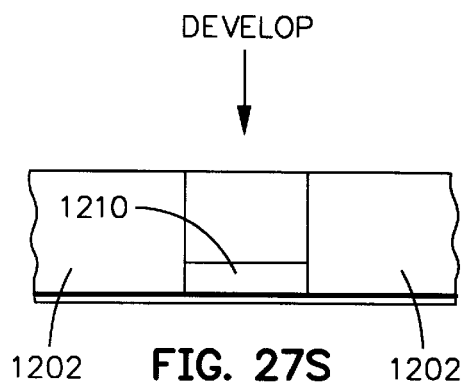
Figure 27T:
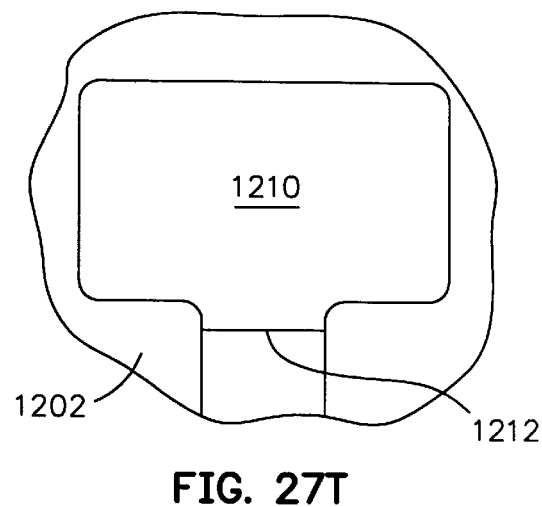
Figure 27U:
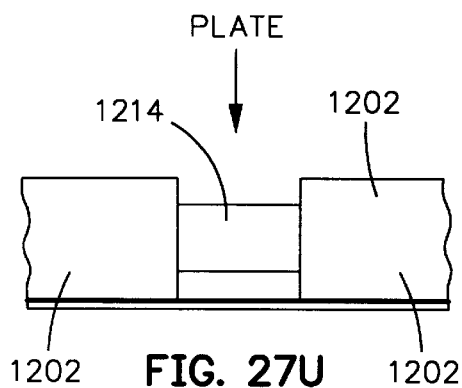
Figure 27V:
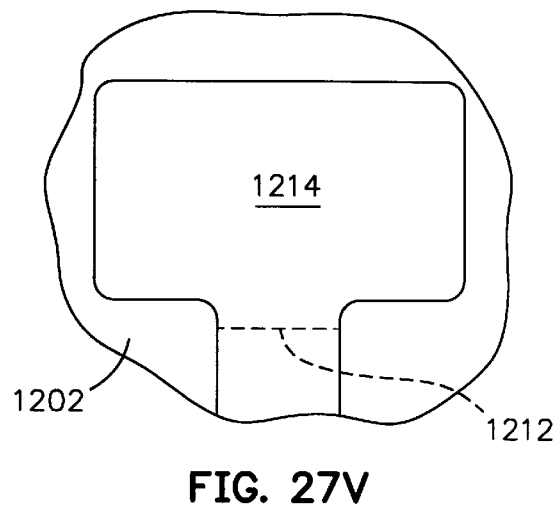
Figure 27W:
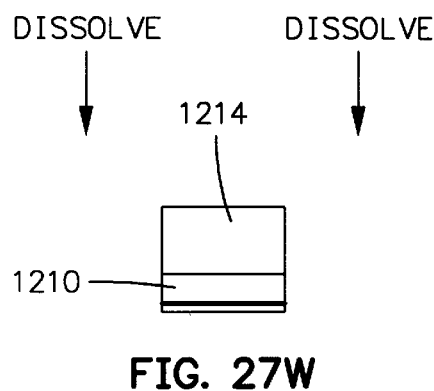
Figure 27X:
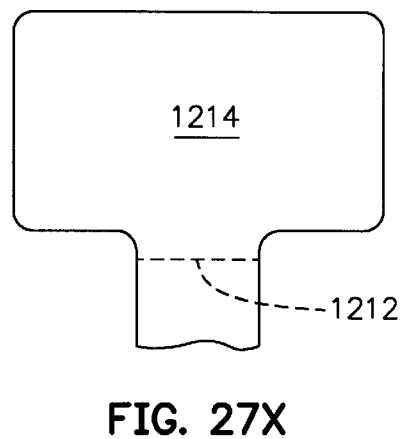

FIGS. 27A–27Z illustrate an exemplary method of construction for constructing the embodiment of the invention shown in FIGS. 21–26. In FIG. 27A a seedlayer (heavy line) is deposited directly on the write gap layer 1200. FIG. 27B is a top plan view of FIG. 27A. FIG. 27C and FIG. 27D are the same as FIG. 27A and FIG. 27B, respectively, except a layer of negative photoresist 1202 has been deposited. FIG. 27E and FIG. 27F are the same as FIG. 27C and FIG. 27D, respectively, except the negative photoresist 1202 has been light imaged in a region which is to De retained. FIG. 27G and FIG. 27H are the same as FIG. 27E and FIG. 27F, respectively, except the negative photoresist has been developed to provide an opening 1204 where the bottom second pole tip layer is to be formed. FIG. 27I and FIG. 27J are the same as FIG. 27G and FIG. 27H, respectively, except a positive photoresist layer 1206 has been spun on the wafer. FIG. 27K and FIG. 27L are the same as FIG. 27I and FIG. 27J, respectively, except the positive photoresist layer 1206 has been light imaged in a region which is to be removed. FIG. 27M and FIG. 27N are the same as FIG. 27K and FIG. 27L, respectively, except the positive photoresist layer has been developed to provide an opening 1208 within the opening 1204 of the negative photoresist layer 1202 where the ZTH defining layer is to be plated. FIG. 27O and FIG. 27P are the same as FIG. 27M and FIG. 27N, respectively, except the ZTH defining layer 1210 has been plated through the openings with a front edge 1212. FIG. 27Q and FIG. 27R are the same as FIG. 27O and FIG. 27P, respectively, except the remainder of the positive photoresist layer 1206 has been light imaged. FIG. 27S and FIG. 27T are the same as FIG. 27Q and FIG. 27R, respectively, except the positive photoresist layer 1206 has been developed and completely removed. FIG. 27U and FIG. 27V are the same as FIG. 27S and FIG. 27T, respectively, except the bottom second pole tip layer 1214 has been plated. FIG. 27W and FIG. 27X are the same as FIG. 27U and FIG. 27V, respectively, except the negative photoresist layer 1202 has been dissolved and completely removed. FIG. 27Y and FIG. 27Z are the same as FIG. 27W and FIG. 27X, respectively, except an insulation layer 1216 of the insulation stack has been formed over a rear portion of the bottom second pole tip layer 1214 for transitioning the top second pole piece layer for its connection to the bottom second pole tip layer 1214.

FIG. 28 illustrates a top plan view of a front portion of the head after its construction according to the method steps set forth in FIGS. 27A–27Z. FIG. 28 shows the substantially vertical edge 1212 of the ZTH defining layer 1210. The bottom second pole tip layer 1214 is on the ZTH defining layer and the insulation layer 1216 of the insulation stack is on a rear portion of the bottom second pole tip layer 1214. The second pole piece layer 1218 extends over the insulation stack and is connected to the bottom second pole tip layer 1214.

The negative photoresist differs from the positive photoresist in that its molecular chain is crosslinked when it is exposed to light. This prevents regions of the negative photoresist layer that are exposed to light from being removed by the developer. With the positive photoresist layer, the regions that are exposed to light are not cross linked and are removed by the developer. Because of this difference, the photoresists can be laid one on top of the other without affecting the performance of either layer when they are developed and removed from the wafer. Both photoresists are a resin. Both photoresists are readily obtainable and can be purchased from Shipley Co., Santa Clara, Calif. The negative photoresist layer is a resin with a cross-linking agent, such as melamine plus a photo-active compound, and the positive photoresist layer is a resin (Nobolak) with a photo-active compound. The light imaging of the negative photoresist layer is actinic illumination. Accordingly, the negative photoresist layer produces a second pole piece plating frame by crosslinking in the area where the photoresist was exposed to actinic illumination.

The fact that this crosslinking takes place, instead of the inhibition of dissolution like one encounters with the positive photoresist, a much larger development process latitude is permitted. This extra process latitude (no CD change even when the overdevelopment is 500%) enables two resist images to be formed on a wafer with the positive photoresist on top of the negative photoresist. Accordingly, negative photoresist is spun on the wafer and imaged for the second pole piece and then the positive photoresist is spun on the wafer. Since the underlying negative photoresist is crosslinked there is no intermixing between the photoresists. The positive resist layer is light imaged where the ZTH defining layer is to be formed and the positive resist is developed to remove the light imaged region so as to provide an opening within the opening of the negative resist. The region left open is electroplated with the non-magnetic metal to a thickness required to achieve proper magnetic decoupling between the first and second pole pieces which is preferably between 0.5 $\mu$m to 1.5 $\mu$m. Subsequently, the positive photoresist layer is light exposed and developed to remove it without damaging the underlying negative photoresist layer, which defines a frame for the second pole piece, whether it be the bottom second pole tip layer or the single second pole piece layer. The second pole piece is then electroplated to a thickness which is preferably 1.5 $\mu$m to 4 $\mu$m.

When the second pole piece includes a bottom second pole tip layer it may be a high magnetic material such as $Ni_{45}Fe_{55}$ as compared to a lower magnetic material for the top second pole piece layer which may be Permalloy ($Ni_{80}Fe_{20}$). The negative photoresist is then removed by a solvent. With this technique the zero throat height defining layer is referred to in the art as self-aligned and is located directly under the second pole piece. By plating the non-magnetic metallic ZTH defining layer after forming the negative photoresist frame for the second pole piece reflective notching has been eliminated. Also, by not having the prior art step, which is caused by the ZTH defining layer, there is improved resist coating uniformity of the negative photoresist layer, thereby increasing the resolution of the light imaging for forming a highly defined second pole piece layer at the pole tip. Further, by plating the ZTH defining layer it is self-aligned and a hard baked cycle with the prior art photoresist ZTH defining layer has been eliminated. By plating the ZTH defining layer, the apex angle has been increased from 25° to almost 90°.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic head having a front located air bearing surface (ABS), a rear located back gap and a zero throat height (ZTH) measured from the ABS to where first and second pole pieces first commence to separate after the ABS, comprising:

said first and second pole pieces and a gap layer;

the first and second pole pieces being separated by the gap layer at the ABS and connected at the back gap;

an insulation stack and at least one coil layer embedded in the insulation stack, said at least one coil layer having a thickness;

the insulation stack and said at least one coil layer separating the first and second pole pieces and being located between the ABS and the back gap;

the insulation stack having at least first and second insulation layers with the first insulation layer separating said at least one coil layer from the first pole piece and the second insulation layer separating said at least one coil layer from the second pole piece;

a discrete zero throat defining layer directly on the gap layer and located entirely between a recessed location and the back gap wherein the recessed location is a location that is recessed from the ABS;

the zero throat defining layer having a front vertical edge that is substantially parallel to the ABS and that is located at said recessed location for defining the ZTH of the head;

the zero throat defining layer being a non-magnetic layer with a thickness less than the thickness of said at least one coil layer; and the entire ZTH defining layer being NiP.

2. A magnetic head as claimed in claim 1 wherein the ZTH defining layer is located entirely between the zero throat and said at least one coil layer.

3. A magnetic head as claimed in claim 1 wherein the zero throat defining layer has a portion that is sandwiched between the top surface of at least a majority of said at least one coil layer and the second pole piece.

4. A magnetic head as claimed in claim 1 wherein said gap layer has a portion that is sandwiched between the top surface of said at least one coil layer and the second pole piece.

5. A magnetic head as claimed in claim 4 wherein the zero throat defining layer has a portion that is sandwiched between the top surface of at least a majority of said at least one coil layer and the second pole piece.

6. A magnetic head as claimed in claim 1 wherein the second pole piece consists of only a single second pole piece layer that extends from the ABS to the back gap.

7. A magnetic head as claimed in claim 6 wherein the zero throat defining layer is located entirely between the ZTH and said at least one coil layer.

8. A magnetic head as claimed in claim 6 wherein the zero throat defining layer has a portion that is sandwiched between the top surface of at least a majority of said at least one coil layer and the second pole piece layer.

9. A magnetic head as claimed in claim 8 wherein said gap layer has a portion that is sandwiched between the top surface of said at least one coil layer and the second pole piece.

10. A magnetic head as claimed in claim 9, including:

first and second coil layers embedded in said insulation stack wherein said at least one coil layer is said first coil layer.

11. A magnetic head having a front located air bearing surface (ABS), a rear located back gap and a zero throat height (ZTH) measured from the ABS to where first and second pole pieces first commence to separate after the ABS, comprising:

said first and second pole pieces and a gap layer;

the first and second pole pieces being separated by the gap layer at the ABS and connected at the back gap;

an insulation stack and at least one coil layer embedded in the insulation stack, said at least one coil layer having a thickness;

the insulation stack and said at least one coil layer separating the first and second pole pieces and being located between the ABS and the back gap;

the insulation stack having at least first and second insulation layers with the first insulation layer separating said at least one coil layer from the first pole piece and the second insulation layer separating said at least one coil layer from the second pole piece;

a discrete zero throat defining layer directly on the gap layer and located entirely between a recessed location and the back gap wherein the recessed location is a location that is recessed from the ABS;

the zero throat defining layer having a front vertical edge that is substantially parallel to the ABS and that is located at said recessed location for defining the ZTH of the head;

the zero throat defining layer being a non-magnetic layer with a thickness less than the thickness of said at least one coil layer; and said first insulation layer of the insulation stack being said gap layer, being the only insulation layer separating said at least one coil layer from the first pole piece and being of a uniform thickness from the ABS to a location between a furthermost recessed end of the coil layer and the back gap.

12. A magnetic head having a front located air bearing surface (ABS), a rear located back gap and a zero throat height (ZTH) measured from the ABS to where first and second pole pieces first commence to separate after the ABS, comprising:

said first and second pole pieces and a gap layer;

the first and second pole pieces being separated by the gap layer at the ABS and connected at the back gap;

an insulation stack and at least one coil layer embedded in the insulation stack, said at least one coil layer having a thickness;

the insulation stack and said at least one coil layer separating the first and second pole pieces and being located between the ABS and the back gap;

the insulation stack having at least first and second insulation layers with the first insulation layer separating said at least one coil layer from the first pole piece and the second insulation layer separating said at least one coil layer from the second pole piece;

a discrete zero throat defining layer directly on the gap layer and located entirely between a recessed location and the back gap wherein the recessed location is a location that is recessed from the ABS;

the zero throat defining layer having a front vertical edge that is substantially parallel to the ABS and that is located at said recessed location for defining the ZTH of the head; and the zero throat defining layer being a non-magnetic layer with a thickness less than the thickness of said at least one coil layer;

the second pole piece consisting of only a single second pole piece layer that extends from the ABS to the back gap; and said first insulation layer of the insulation stack being said gap layer, being the only insulation layer separating said at least one coil layer from the first pole piece and being of a uniform thickness from the ABS to a location between a furthermost recessed end of the coil layer and the back gap.

13. A magnetic head having a front located air bearing surface (ABS), a rear located back gap and a zero throat height (ZTH) measured from the ABS to where first and second pole pieces first commence to separate after the ABS, comprising:

said first and second pole pieces and a gap layer;

the first and second pole pieces being separated by the gap layer at the ABS and connected at the back gap;

an insulation stack and at least one coil layer embedded in the insulation stack, said at least one coil layer having a thickness;

the insulation stack and said at least one coil layer separating the first and second pole pieces and being located between the ABS and the back gap;

the insulation stack having at least first and second insulation layers with the first insulation layer separating said at least one coil layer from the first pole piece and the second insulation layer separating said at least one coil layer from the second pole piece;

a discrete zero throat defining layer directly on the gap layer and located entirely between a recessed location and the back gap wherein the recessed location is a location that is recessed from the ABS;

the zero throat defining layer having a front vertical edge that is substantially parallel to the ABS and that is located at said recessed location for defining the ZTH of the head;

the zero throat defining layer being a non-magnetic layer with a thickness less than the thickness of said at least one coil layer; and the second pole piece having a discrete bottom second pole tip layer and a discrete top second pole piece layer wherein the bottom second pole tip layer is located entirely between the ABS and said at least one coil layer and having a first portion directly on a top surface of the gap layer and a second portion directly on a top surface of the zero throat defining layer and the top second pole piece layer having a front layer portion that is magnetically connected to a top surface of the bottom second pole tip layer and a back layer portion that is magnetically connected to the first pole piece.

14. A magnetic head as claimed in claim 13 wherein said first insulation layer of the insulation stack is said gap layer, is the only insulation layer separating said at least one coil layer from the first pole piece and is of a uniform thickness from the ABS to a location between a furthermost recessed end of the coil layer and the back gap.

15. A magnetic head as claimed in claim 13 wherein the zero throat defining layer is located entirely between the ZTH and said at least one coil layer.

16. A magnetic head as claimed in claim 13 wherein the zero throat defining layer has a portion that is sandwiched between the top surface of at least a majority of said at least one coil layer and the second pole piece.

17. A magnetic head as claimed in claim 16 wherein said gap layer has a portion that is sandwiched between the top surface of said at least one coil layer and the second pole piece.

18. A magnetic head as claimed in claim 17 wherein the entire zero throat defining layer is NiP.

19. A magnetic head as claimed in claim 17, including:

first and second coil layers embedded in said insulation stack wherein said at least one coil layer is said first coil layer.

20. A magnetic head as claimed in claim 17, including:

the top second pole piece layer having a front wall that is recessed from the ABS; and the bottom second pole tip layer first commencing to widen after the ABS at a location between the ZTH and the front wall of the top second pole piece layer.

21. A magnetic head having a front located air bearing surface (ABS), a rear located back gap and a zero throat height (ZTH) measured from the ABS to where first and second pole pieces first commence to separate after the ABS, comprising:

said first and second pole pieces and a gap layer;

the first and second pole pieces being separated by the gap layer at the ABS and connected at the back gap;

an insulation stack and at least one coil layer embedded in the insulation stack, said at least one coil layer having a thickness;

the insulation stack and said at least one coil layer separating the first and second pole pieces and being located between the ABS and the back gap;

the insulation stack having at least first and second insulation layers with the first insulation layer separating said at least one coil layer from the first pole piece and the second insulation layer separating said at least one coil layer from the second pole piece;

a discrete zero throat defining layer directly on the gap layer and located entirely between a recessed location and the back gap wherein the recessed location is a location that is recessed from the ABS;

the zero throat defining layer having a front vertical edge that is substantially parallel to the ABS and that is located at said recessed location for defining the ZTH of the head;

the zero throat defining layer being a non-magnetic layer with a thickness less than the thickness of said at least one coil layer; and a portion of the zero throat defining layer extending over a majority of the insulation stack.

22. A magnetic head as claimed in claim 21 wherein the ZTH defining layer is substantially entirely planar.

23. A magnetic head as claimed in claim 22 wherein said first insulation layer of the insulation stack is said gap layer, is the only insulation layer separating said at least one coil layer from the first pole piece and is of a uniform thickness from the ABS to a location between a furthermost recessed end of the coil layer and the back gap.

24. A magnetic head as claimed in claim 22 wherein the zero throat defining layer is located entirely between the ZTH and said at least one coil layer.

25. A magnetic head as claimed in claim 24 wherein the entire zero throat defining layer is NiP.

26. A merged magnetic head having a front located air bearing surface (ABS) and write head and read head portions, the write head portion having a rear located back gap and a zero throat height (ZTH) that is measured from the ABS to where first and second pole pieces first commence to separate after the ABS, comprising:

said write head portion including:

said first and second pole pieces and a gap layer;

the first and second pole pieces being separated by the gap layer at the ABS and connected at the back gap;

an insulation stack and at least one coil layer embedded in the insulation stack, said at least one coil layer having a thickness;

the insulation stack and said at least one coil layer separating the first and second pole pieces and being located between the ABS and the back gap;

the insulation stack having at least first and second insulation layers with the first insulation layer separating said at least one coil layer from the first pole piece and the second insulation layer separating said at least one coil layer from the second pole piece;

a discrete zero throat defining layer directly on the gap layer and located entirely between a recessed location and the back gap wherein the recessed location is a location that is recessed from the ABS;

the zero throat defining layer having a front vertical edge that is substantially parallel to the ABS and that is located at said recessed location for defining the ZTH of the head; and an entirely of the zero throat defining layer being a non-magnetic metallic layer with a thickness that is less than the thickness of said at least one coil layer;

a read head portion including:

a first and second shield layers wherein the second shield layer is a common layer with said first pole piece;

first and second read gap layers between the first and second shield layers;

a read sensor and first and second lead layers connected to the read sensor located between the first and second read gap layers; and the entire zero throat defining layer being NiP.

27. A merged magnetic head as claimed in claim 26 wherein the zero throat defining layer has a portion that is sandwiched between the top surface of at least a majority of said at least one coil layer and the second pole piece.

28. A merged magnetic head as claimed in claim 27 wherein said gap layer has a portion that is sandwiched between the top surface of said at least one coil layer and the second pole piece.

29. A merged magnetic head as claimed in claim 28 wherein the entire second pole piece is a single second pole piece layer that extends from the ABS to the back gap.

30. A merged magnetic head having a front located air bearing surface (ABS) and write head and read head portions, the write head portion having a rear located back gap and a zero throat height (ZTH) that is measured from the ABS to where first and second pole pieces first commence to separate after the ABS, comprising:

said write head portion including:

said first and second pole pieces and a gap layer;

the first and second pole pieces being separated by the gap layer at the ABS and connected at the back gap;

an insulation stack and at least one coil layer embedded in the insulation stack, said at least one coil layer having a thickness;

the insulation stack and said at least one coil layer separating the first and second pole pieces and being located between the ABS and the back gap;

the insulation stack having at least first and second insulation layers with the first insulation layer separating said at least one coil layer from the first pole piece and the second insulation layer separating said at least one coil layer from the second pole piece;

a discrete zero throat defining layer directly on the gap layer and located entirely between a recessed location and the back gap wherein the recessed location is a location that is recessed from the ABS;

the zero throat defining layer having a front vertical edge that is substantially parallel to the ABS and that is located at said recessed location for defining the ZTH of the head; and an entirely of the zero throat defining layer being a non-magnetic metallic layer with a thickness that is less than the thickness of said at least one coil layer;

a read head portion including:

first and second shield layers wherein the second shield layer is a common layer with said first pole piece;

first and second read gap layers between the first and second shield layers; and a read sensor and first and second lead layers connected to the read sensor located between the first and second read gap layers;

the zero throat defining layer having a portion that is sandwiched between the top surface of at least a majority of said at least one coil layer and the second pole piece;

said gap layer having a portion that is sandwiched between the top surface of said at least one coil layer and the second pole piece; and the second pole piece having a discrete bottom second pole tip layer and a discrete top second pole piece layer wherein the bottom second pole tip layer is located entirely between the ABS and said at least one coil layer and having a first portion directly on a top surface of the gap layer and a second portion directly on a top surface of the zero throat defining layer and the top second pole piece layer having a front layer portion that is magnetically connected to the bottom second pole tip layer and a back layer portion that is magnetically connected to the first pole piece.

31. A merged magnetic head having a front located air bearing surface (ABS) and write head and read head portions, the write head portion having a rear located back gap and a zero throat height (ZTH) that is measured from the ABS to where first and second pole pieces first commence to separate after the ABS, comprising:

said write head portion including:

said first and second pole pieces and a zap layer;

the first and second pole pieces being separated by the gap layer at the ABS and connected at the back gap;

an insulation stack and at least one coil layer embedded in the insulation stack, said at least one coil layer having a thickness;

the insulation stack and said at least one coil layer separating the first and second pole pieces and being located between the ABS and the back zap;

the insulation stack having at least first and second insulation layers with the first insulation layer separating said at least one coil layer from the first pole piece and the second insulation layer separating said at least one coil layer from the second pole piece;

a discrete zero throat defining layer directly on the gap layer and located entirely between a recessed location and the back gap wherein the recessed location is a location that is recessed from the ABS;

the zero throat defining layer having a front vertical edge that is substantially parallel to the ABS and that is located at said recessed location for defining the ZTH of the head; and an entirety of the zero throat defining layer being a non-magnetic metallic layer with a thickness that is less than the thickness of said at least one coil layer;

a read head portion including:

first and second shield layers wherein the second shield layer is a common layer with said first pole piece;

first and second read gap layers between the first and second shield layers;

a read sensor and first and second lead layers connected to the read sensor located between the first and second read gap layers;

the zero throat defining layer having a portion that is sandwiched between the top surface of at least a majority of said at least one coil layer and the second pole piece;

said gap layer having a portion that is sandwiched between the top surface of said at least one coil layer and the second pole piece; and a portion of the zero throat defining layer also extending over a majority of the insulation stack.

32. A magnetic disk drive comprising:

a frame;

a magnetic disk rotatably supported on the frame;

a merged magnetic head;

a support mounted on the frame for supporting the merged magnetic head in a transducing relationship with the magnetic disk;

means for rotating the magnetic disk;

positioning means connected to the support for moving the merged magnetic head to multiple positions with respect to said magnetic disk;

means connected to the head, to the means for rotating the magnetic disk and to the positioning means for exchanging signals with the merged magnetic head, for controlling movement of the magnetic disk and for controlling the position of the merged magnetic head;

the merged magnetic head including a write head portion and a read head portion that have a front located air bearing surface (ABS) and the write head portion having a rear located back gap and a zero throat height (ZTH) that is measured from the ABS to where first and second pole pieces first commence to separate after the ABS;

said write head portion including:

said first and second pole pieces and a gap layer;

the first and second pole pieces being separated by the gap layer at the ABS and connected at the back gap;

an insulation stack and at least one coil layer embedded in the insulation stack;

the insulation stack and said at least one coil layer separating the first and second pole pieces and being located between the ABS and the back gap;

the insulation stack having at least first and second insulation layers with the first insulation layer separating said at least one coil layer from the first pole piece and the second insulation layer separating said at least one coil layer from the second pole piece, said at least one coil layer having a thickness;

a discrete zero throat defining layer directly on the gap layer and located entirely between a recessed location and the back gap wherein the recessed location is a location that is recessed from the ABS;

the zero throat defining layer having a front vertical edge that is substantially parallel to the ABS and that is located at said recessed location for defining the ZTH of the head; and an entirety of the zero throat defining layer being a non-magnetic metallic layer with a thickness that is less than the thickness of said at least one coil layer;

said read head portion including:

a first and second shield layers wherein the second shield layer is a common layer with said first pole piece;

first and second read gap layers between the first and second shield layers;

a read sensor and first and second lead layers connected to the read sensor located between the first and second read gap layers; and the entire zero throat defining layer being NiP.

33. A magnetic disk drive as claimed in claim 32 wherein the zero throat defining layer has a portion that is sandwiched between the top surface of at least a majority of said at least one coil layer and the second pole piece.

34. A magnetic disk drive as claimed in claim 33 wherein said gap layer has a portion that is sandwiched between the top surface of said at least one coil layer and the second pole piece.

35. A magnetic disk drive as claimed in claim 34 wherein the second pole piece consists of only a single second pole piece layer that extends from the ABS to the back gap.

36. A magnetic disk drive as claimed in claim 34 wherein a portion of the zero throat defining layer also extends over a majority of the insulation stack.

37. A magnetic disk drive comprising:
a frame;
a magnetic disk rotatably supported on the frame;
a merged magnetic head;
a support mounted on the frame for supporting the merged magnetic head in a transducing relationship with the magnetic disk;
means for rotating the magnetic disk;
positioning means connected to the support for moving the merged magnetic head to multiple positions with respect to said magnetic disk;
means connected to the head, to the means for rotating the magnetic disk and to the positioning means for exchanging signals with the merged magnetic head, for controlling movement of the magnetic disk and for controlling the position of the merged magnetic head;
the merged magnetic head including a write head portion and a read head portion that have a front located air bearing surface (ABS) and the write head portion having a rear located back gap and a zero throat height (ZTH) that is measured from the ABS to where first and second pole pieces first commence to separate after the ABS;
said write head portion including:
said first and second pole pieces and a gap layer;
the first and second pole pieces being separated by the gap layer at the ABS and connected at the back gap;
an insulation stack and at least one coil layer embedded in the insulation stack;
the insulation stack and said at least one coil layer separating the first and second pole pieces and being located between the ABS and the back gap;
the insulation stack having at least first and second insulation layers with the first insulation layer separating said at least one coil layer from the first pole piece and the second insulation layer separating said at least one coil layer from the second pole piece, said at least one coil layer having a thickness;
a discrete zero throat defining layer directly on the gap layer and located entirely between a recessed location and the back gap wherein the recessed location is a location that is recessed from the ABS;
the zero throat defining layer having a front vertical edge that is substantially parallel to the ABS and that is located at said recessed location for defining the ZTH of the head; and
an entirety of the zero throat defining layer being a non-magnetic metallic layer with a thickness that is less than the thickness of said at least one coil layer;
said read head portion including:
first and second shield layers wherein the second shield layer is a common layer with said first pole piece;
first and second read gap layers between the first and second shield layers; and
a read sensor and first and second lead layers connected to the read sensor located between the first and second read gap layers;
the zero throat defining layer having a portion that is sandwiched between the top surface of at least a majority of said at least one coil layer and the second pole piece;
said gap layer having a portion that is sandwiched between the top surface of said at least one coil layer and the second pole piece; and
the second pole piece having a discrete bottom second pole tip layer and a discrete top second pole piece layer wherein the bottom second pole tip layer is located entirely between the ABS and said at least one coil layer and having a first portion directly on a top surface of the gap layer and a second portion directly on a top surface of the zero throat defining layer and the top second pole piece layer having a front layer portion that is magnetically connected to a top surface of the bottom second pole tip layer and a back layer portion that is magnetically connected to the first pole piece.

38. A magnetic head having a front located air bearing surface (ABS), a rear located back gap and a zero throat height (ZTH) measured from the ABS to where first and second pole pieces first commence to separate after the ABS, comprising:
said first and second pole pieces and a gap layer;
the first and second pole pieces being separated by the gap layer at the ABS and connected at the back gap;
an insulation stack and at least one coil layer embedded in the insulation stack, said at least one coil layer having a thickness;
the insulation stack and said at least one coil layer separating the first and second pole pieces and being located between the ABS and the back gap;
the insulation stack having at least first and second insulation layers with the first insulation layer separating said at least one coil layer from the first pole piece and the second insulation layer separating said at least one coil layer from the second pole piece;
a zero throat defining layer on the gap layer and located between the ABS and the back gap;
the zero throat defining layer having a front vertical edge that is substantially parallel to the ABS and that is recessed from the ABS for defining the ZTH of the head;
the zero throat defining layer being a non-magnetic layer with a thickness less than the thickness of said at least one coil layer;
the second pole piece having a bottom second pole tip layer and a top second pole piece layer wherein the bottom second pole tip layer is located entirely between the ABS and said at least one coil layer and the top second pole piece layer having a front layer portion that is magnetically connected to the bottom second pole tip layer and a back layer portion that is magnetically connected to the first pole piece;
the zero throat defining layer having a portion that is sandwiched between the top surface of said at least one coil layer and the second pole piece layer;
said gap layer having a portion that is sandwiched between the top surface of said at least one coil layer and the second pole piece;
the top second pole piece layer having a front wall that is recessed from the ABS; and
the bottom second pole tip layer first commencing to widen after the ABS at a location between the ZTH and the front wall of the top second pole piece layer.

39. A magnetic head as claimed in claim 38 wherein said first insulation layer of the insulation stack is a common layer with said gap layer and is the only insulation layer separating said at least one coil layer from the first pole piece.

40. A magnetic head as claimed in claim 38 wherein the zero throat defining layer is located entirely between the ZTH and said at least one coil layer.

41. A magnetic head as claimed in claim 38 wherein the zero throat defining layer has a portion that is sandwiched between the top surface of said at least one coil layer and the second pole piece layer.

42. A magnetic head as claimed in claim 38 wherein said gap layer has a portion that is sandwiched between the top surface of said at least one coil layer and the second pole piece.

43. A magnetic head as claimed in claim 42 wherein the zero throat defining layer has a portion that is sandwiched between the top surface of said at least one coil layer and the second pole piece layer.

44. A magnetic head as claimed in claim 38 wherein a portion of the zero throat defining layer also extends over a majority of the insulation stack.

45. A magnetic head as claimed in claim 44 wherein the zero throat defining layer is substantially entirely planar.

46. A magnetic head as claimed in claim 45 wherein said first insulation layer of the insulation stack is a common layer with said gap layer and is the only insulation layer separating said at least one coil layer from the first pole piece.

* * * * *